(12) United States Patent
Baba et al.

(10) Patent No.: US 6,437,881 B1
(45) Date of Patent: Aug. 20, 2002

(54) IMAGE PROCESSING APPARATUS AND IMAGE PROCESSING METHOD

(75) Inventors: Hideki Baba; Hiroshi Sekine; Noriyuki Kurabayashi; Yumi Sekiguchi; Mikihiro Mori, all of Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/159,625

(22) Filed: Sep. 24, 1998

(30) Foreign Application Priority Data

Oct. 15, 1997 (JP) ............................................. 9-281935

(51) Int. Cl.[7] ................................................ H04N 1/40
(52) U.S. Cl. ...................... 358/434; 358/1.9; 358/462; 358/448; 382/173; 382/176
(58) Field of Search ................................. 358/474, 434, 358/462, 464, 468, 435–438; 382/173, 176, 175, 299, 289, 302, 164, 166; 345/433

(56) References Cited

U.S. PATENT DOCUMENTS 5,153,936 A * 10/1992 Morris et al. ............... 395/128

(List continued on next page.)

FOREIGN PATENT DOCUMENTS

| JP | 61-098210 | * | 11/1987 |
| JP | 62-256573 | | 11/1987 |
| JP | A-3-126180 | | 5/1991 |
| JP | A-4-105178 | | 4/1992 |
| JP | 03-355875 | * | 7/1993 |
| JP | 05-176162 | | 7/1993 |
| JP | 04-151895 | * | 12/1993 |
| JP | 05-342314 | | 12/1993 |

OTHER PUBLICATIONS

Layered Representation for Image Sequence Coding, John Wang and Edward Adelson, 1993, The Media Laboratory Massachusetts Institute of Technology V221–V224.*
Layered representations for Vision and Video, Edward Adelson, 1995, Dept. Brain and Cognitive Sciences and Media Laboratory, MIT, pp. 3–9.*
Draft Recommendation T.44, Mixed Raster Content (MRC): Study Group 8–Contribution 21, International Telecommunication Union, pp. 1–29, May 1997.*

*Primary Examiner*—Edward Coles
*Assistant Examiner*—Tia A. Carter
(74) *Attorney, Agent, or Firm*—Oliff&Berridge, PLC

(57) ABSTRACT

An image of an original document supplied from a scanner portion or the like is, in an attribute-determining portion, subjected to a process for determining whether each pixel is a character pixel or a picture pixel. Thus, separating information is transmitted to a two-layer separating portion and transmitted to a resolution converting portion as data of a separating information plane. The two-layer separating portion separates the image of the original document into a character information plane and a picture information plane in accordance with separating information. The resolution converting portion has a plurality of resolution converting methods. In accordance with transmission attribute information supplied from outside, a transmission-attribute-information recognizing portion selects a resolution converting method independently for each plane. The resolution converting portion uses the selected resolution converting method to subject each plane to the resolution converting process. Each plane submitted to the resolution conversion is formatted in an image-format-lapping portion so as to be transmitted from a transmitting portion through a network.

11 Claims, 22 Drawing Sheets

U.S. PATENT DOCUMENTS

| | | | |
|---|---|---|---|
| 5,235,436 A | * 8/1993 | Sakamoto et al. | 358/462 |
| 5,335,290 A | * 8/1994 | Cullen et al. | 382/9 |
| 5,414,527 A | * 5/1995 | Koshi et al. | |
| 5,424,854 A | * 6/1995 | Hashimoto | |
| 5,465,304 A | * 11/1995 | Cullen et al. | 382/176 |
| 5,608,819 A | * 3/1997 | Ikeuchi | 382/156 |
| 5,649,025 A | * 7/1997 | Revankar | 382/171 |
| 5,680,526 A | * 10/1997 | Andersen et al. | |
| 5,704,019 A | * 12/1997 | Akiyama et al. | |
| 5,717,940 A | * 2/1998 | Peairs | 395/777 |
| 5,754,710 A | * 5/1998 | Sekine et al. | 382/300 |
| 5,778,092 A | * 7/1998 | Macleod et al. | |
| 5,781,666 A | * 7/1998 | Ishizawa et al. | 382/284 |
| 5,862,257 A | * 1/1999 | Sekine et al. | 382/199 |
| 5,889,927 A | * 3/1999 | Suzuki | 395/102 |
| 6,067,320 A | * 5/2000 | Takahashi et al. | |
| 6,175,425 B1 | * 1/2001 | Khorram | 358/1.9 |

\* cited by examiner

| QUALITY OF IMAGE WHICH IS TRANSMITTED | TRANSMISSION SPEED | TYPE OF ORIGINAL DOCUMENT WHICH MUST BE TRANSMITTED | |
|---|---|---|---|
| SUPER FINE | VERY HIGH SPEED | COLOR | CHARACTERS/ PHOTOGRAPH |
| FINE | HIGH SPEED | WHITE AND BLACK | CHARACTERS |
| STANDARD | STANDARD | | PHOTOGRAPH |

FIG. 4

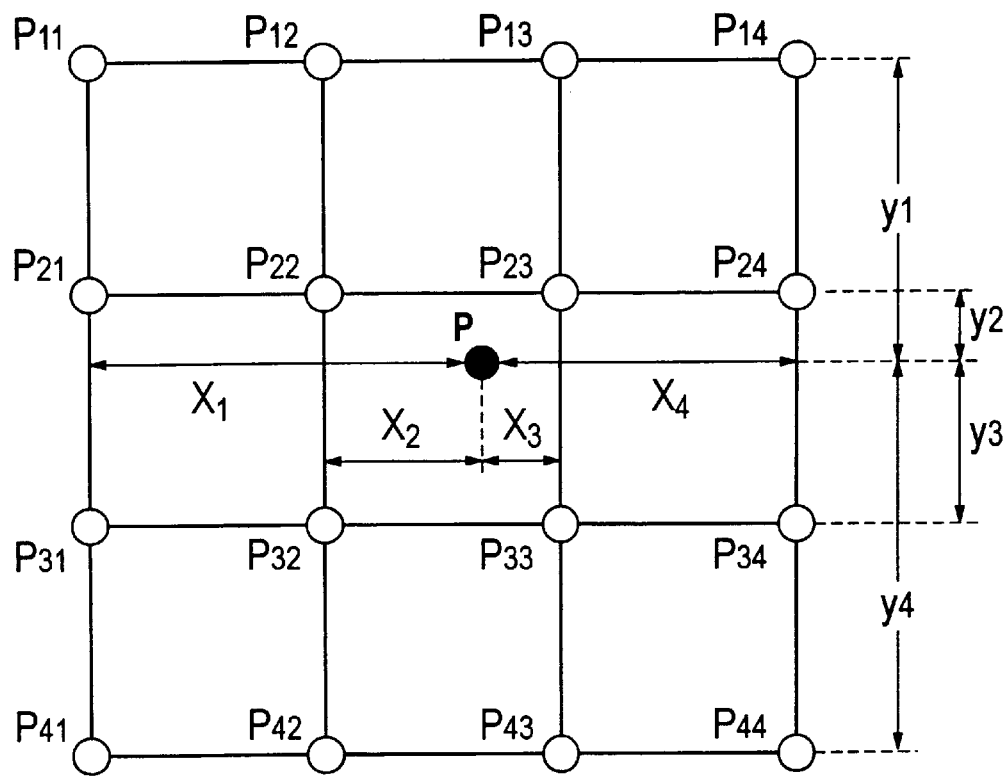
FIG. 9
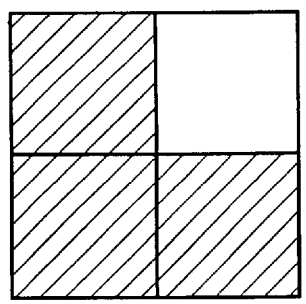
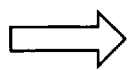
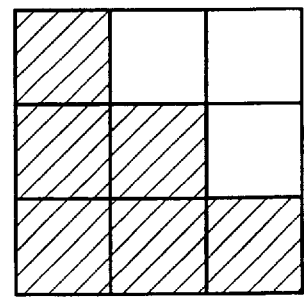
FIG. 10A  FIG. 10B

| HEADER PORTION | HEADER FOR SEPARATING INFORMATION PLANE | COMPRESSED DATA OF SEPARATING INFORMATION PLANE | HEADER FOR CHARACTER INFORMATION PLANE | COMPRESSED DATA OF CHARACTER INFORMATION PLANE | HEADER FOR PICTURE INFORMATION PLANE | COMPRESSED DATA OF PICTURE INFORMATION PLANE |

FIG. 11

IMAGE PROCESSING APPARATUS AND IMAGE PROCESSING METHOD

BACKGROUND OF THE INVENTION

The present invention relates to an image processing apparatus and an image processing method with which an image is processed for communicating image data with a high quality between different types of apparatuses through a network line, such as a public telephone line or a LAN. Further, the present invention is also related to color facsimile machines, or to transmission/reception of images on the Internet.

In recent years, image communication using a public telephone line or a LAN has been widely performed, in addition to facsimile communication. A variety of apparatuses for communicating image data have been employed, for example, personal computers, composite digital copying machines and network printers, in addition to facsimile machines. Moreover, color apparatuses of the foregoing types have been used, thus resulting in color facsimile machines and color printers being used mainly.

When image data is communicated between apparatuses of different types, the following process is usually employed: the type of a supplied image of an original document is determined; the overall image is subjected to an image process adaptable to the original document; and then processed image data is transmitted to a transmission-side apparatus. When the overall body of the image of the original document is collectively treated, no problem arises if the image of the original document is composed of image data having one type of attribute, for example, if the image is composed of only characters or only photographs. However, there arises a problem if the image is composed of data having plural attributes, for example, a mixed image having characters and photographs. When, for example, data of a mixed image having characters and photographs is compressed, character portions and photograph portions are similarly subjected to the compressing process. Therefore, a compression ratio of either of the character portions or the photograph portions is reduced depending on the employed compressing method. As an alternative to this, the image quality deteriorates.

When adaptation to a receiving apparatus is attempted to be made or when the quantity of data which must be transmitted is required to be reduced, image data is sometimes subjected to a resolution converting process. If a portion required to be transmitted with a high image quality exists in data, the overall body of the image must be transmitted with a high resolution. Thus, the quantity of data which must be transmitted cannot be reduced. If the image is required to quickly be transmitted in a real time manner, the image must be transmitted with a low resolution. In the foregoing case, the image quality deteriorates excessively.

SUMMARY OF THE INVENTION

In view of the foregoing, an object of the present invention is to provide an image processing apparatus and an image processing method with which an image can be transmitted at higher speed with a high quality. Particularly, in the present invention, resolution which is one of components of an image-structure is considered.

The present invention has a structure that supplied image is separated into a first piece of image data, a second piece of image data, and selecting data for selecting the first piece of image data, or the second piece of image data and that separated data is transmitted. At this time, the first piece of image data, the second piece of image data, and the selecting data are subjected to corresponding resolution converting processes and conversion of the resolution using corresponding resolution converting methods. Thus, data which does not require a high resolution can be transmitted at high speed. Data of a type which must have high resolutions may be transmitted at the high resolution. Since the resolutions can be converted to optimum resolutions when data is transmitted, data can be transmitted at high speed. Moreover, deterioration in the quality of the image can be prevented.

Each of the first piece of image data, the second piece of image data, and the selecting data may be omitted from the resolution conversion. Data having the resolution which must be converted may be converted into an adaptable resolution by using an adaptable resolution converting method. When the resolutions of a plurality of data items are converted, the same resolution converting method may be employed or different methods may be employed. When the resolution of the supplied image is maintained for selecting data, a satisfactory quality of the image can be maintained. Also in this case, the resolutions of the first piece of image data and the second piece of image data may be converted. When the same resolution converting method is employed for the first piece of image data, the second piece of image data, and the selecting data when the resolutions are converted, conversion of the resolutions is performede. Then, separation to each data is performed so as to raise the processing speed.

BRIEF DESCRIPTION OF THE DRAWINGS

FIG. 4 is a plan view showing an example of a user interface.

FIG. 9 is a diagram showing a sixteen-point interpolation method.

FIGS. 10A and 10B are diagram showing a logical calculation method.

FIG. 11 is a diagram showing an example of an image format.

DETAILED DESCRIPTION OF THE PREFERRED EMBODIMENTS

Figure 1:
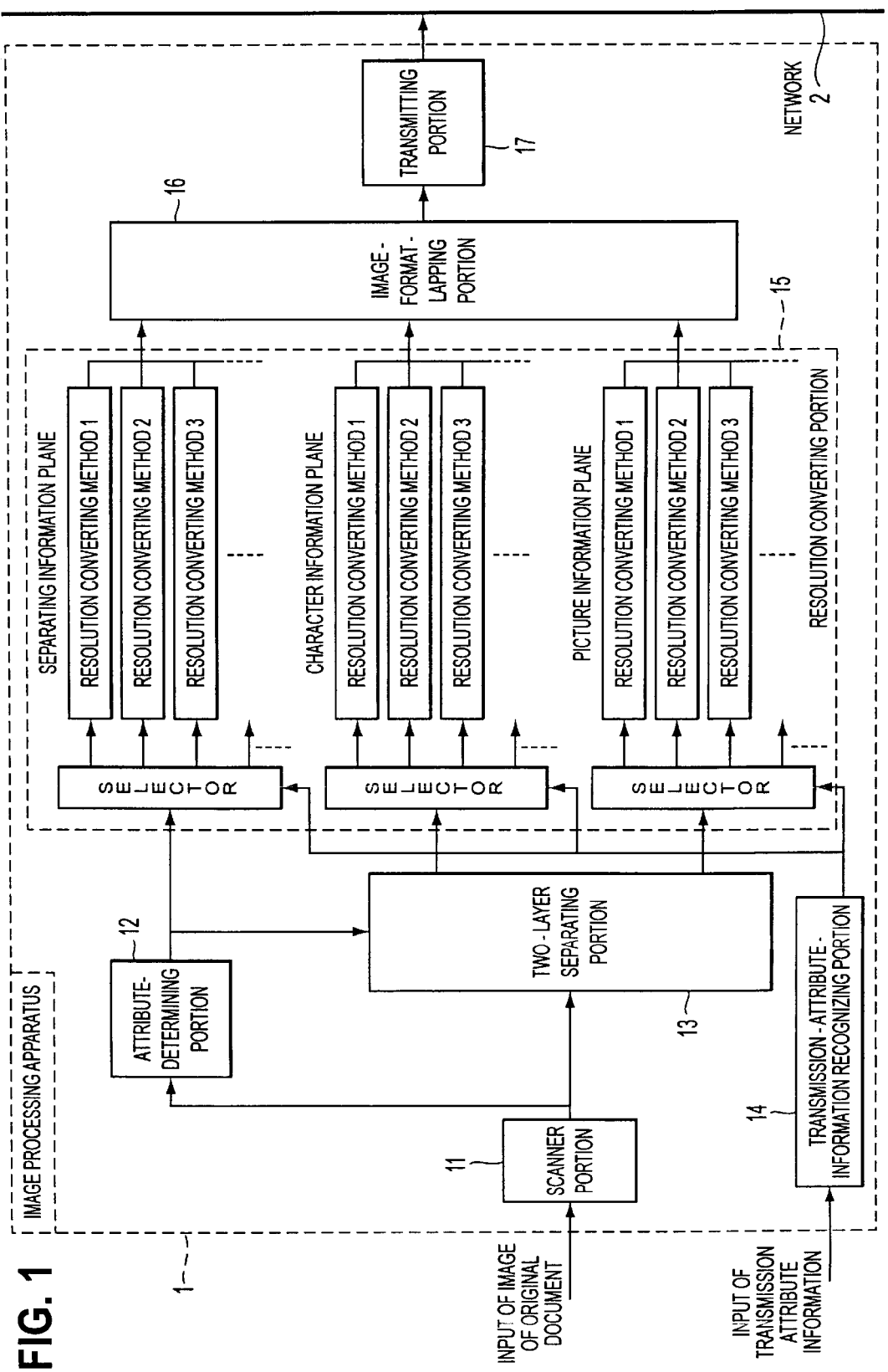
FIG. 1 is a diagram showing the structure of a first embodiment of an image processing apparatus according to the present invention.

FIG. 1 is a diagram showing the structure of a first embodiment of an image processing apparatus according to the present invention. Referring to FIG. 1, reference numeral 1 represents an image processing apparatus, 2 represents a network, 11 represents a scanner portion, 12 represents an attribute-determining portion, 13 represents a two-layer separating portion, 14 represents a transmission-attribute-information recognizing portion, 15 represents a resolution converting portion, 16 represents an image-format-lapping portion and 17 represents a transmitting portion. The image processing apparatus 1 fetches image data to process image data so as to transmit image data to another apparatus through the network 2. The network 2 is a network line, such as a public telephone line, an exclusive line or a LAN. In addition to the image processing apparatus 1, other input apparatuses, output apparatuses, storage apparatuses and one or more image processing apparatuses of a type according to the present invention may be employed. Transmitted data may be received by an output apparatus, a storage apparatus or a computer apparatus including output apparatuses and storage apparatuses. In this case, the output apparatus is not required to be an apparatus of a type for producing a printed output on a recording medium, such as paper. For example, the output apparatus may be a display unit.

The scanner portion 11 scans the image of an original document to A/D-convert data of the image so as to fetch image data as a digital image. The means for inputting an image is not limited to the scanner portion 11. For example, the image may be input from a digital camera. The image may be in the form of an electronic document received from a host computer or the like (not shown) through a network. The scanner portion 11 is not always require, and another input means may be provided additionally.

The attribute-determining portion 12 extracts a characteristic quantity of image data supplied from the scanner portion 11 so as to produce separating information for separating image data in one pixel unit or several pixel units or a predetermined region units depending on the types of the attributes. Separating information is employed as selecting data for selecting either one or two images separated by the two-layer separating portion 13. Hereinafter, a set of separating information items corresponding to supplied images will be called separating information planes.

The two-layer separating portion 13 separates image data supplied from the scanner portion 11 into a first piece of image data and a second piece of image data. In this case, an assumption is made that image data is separated into character information data which is a first piece of image data and which is composed of character information and picture information data which is a second piece of image data and which is composed of picture information. Hereinafter, an image composed of only separated character information is called a character information plane and an image composed of only separated picture information is called a picture information plane.

The transmission-attribute-information recognizing portion 14 recognizes transmission attribute information supplied from outside by a user so as to perform control of switching of resolution converting methods which are adapted to the separating information plane, character information plane and picture information plane in accordance with a result of recognition.

The resolution converting portion 15 converts the resolutions of the character information plane, the character information plane and the picture information plane by using the resolution converting methods selected by the transmission-attribute-information recognizing portion 14. An independent and arbitrary resolution converting method may be selected for each plane. An independent and arbitrary resolution may be set to each plane. For example, FIG. 1 shows a separating information plane 21 having at least resolution converting methods 21-1, 21-2, 21-3; a character information plane having at least resolution converting methods 22-1, 22-2, 22-3; and a picture information plane having at least resolution converting methods 23-1, 23-2, and 23-3. Although FIG. 1 shows the structure in which a plurality of resolution converting methods are provided for each plane so as to be selected by a selector, the method is not limited to this. Another structure may be employed in which a program for executing a selected resolution converting method is loaded. Another structure may be employed in which one or more resolution converting methods are provided so as to commonly be used by each plane. Also in this case, the structure is required such that an employed resolution converting method is not limited by a resolution converting method which is employed by another plane. As a matter of course, there may be a case where the resolution of a certain plane is not converted and an output of the plane is produced.

The image-format-lapping portion 16 converts the separating information plane, the character information plane and the picture information plane subjected to the resolution converting process in the resolution converting portion 15 into a predetermined image format and produces the outputs of the three planes. At this time, each plane may be subjected to an adaptable image process, such as a compressing process.

The transmitting portion 17 transmits, to another apparatus, data converted into a predetermined image format in the image-format-lapping portion 16, data being transmitted through the network 2. At this time, a communication procedure may be an arbitrary procedure adaptable to the network 2.

Figure 2:
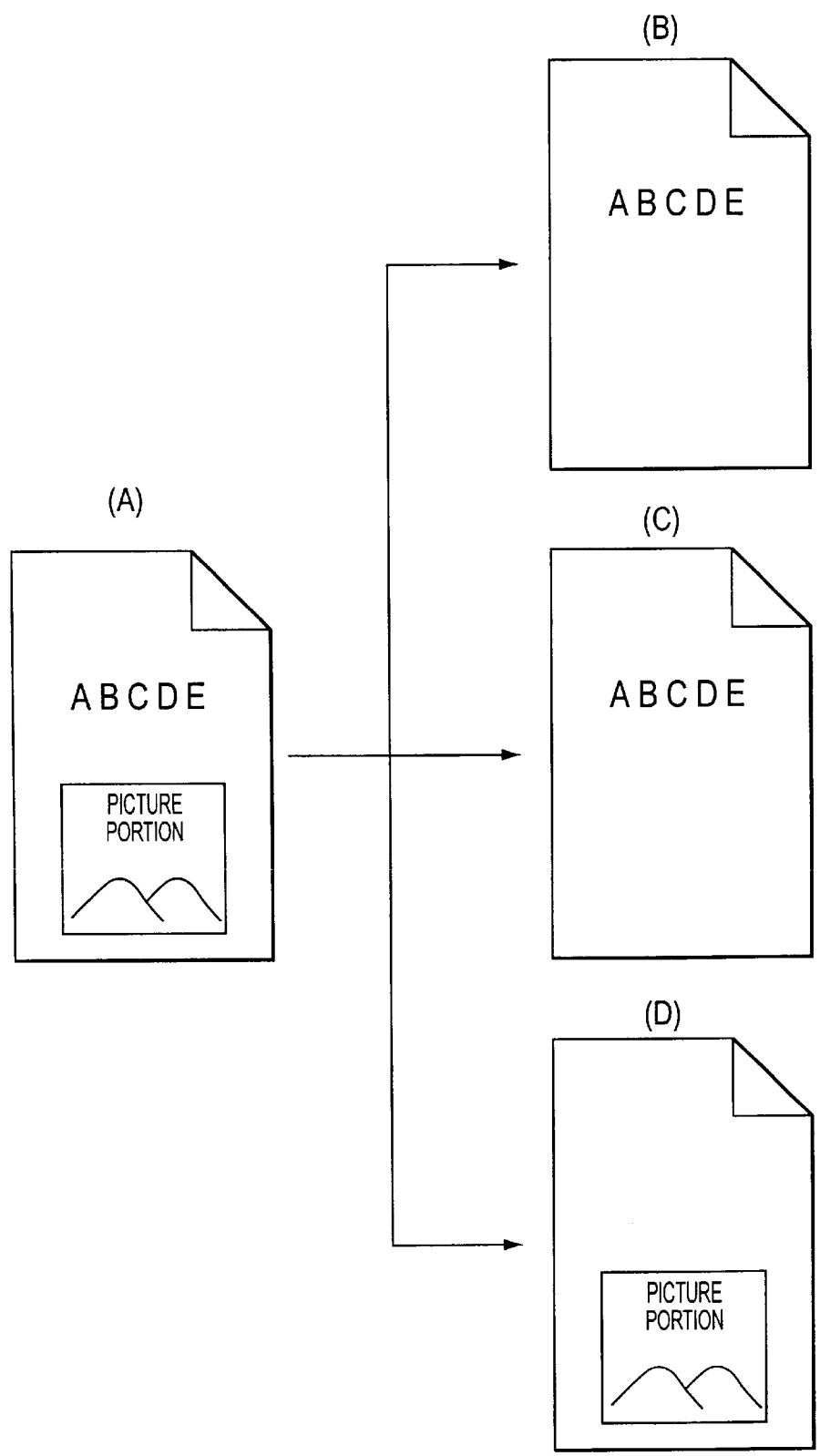
FIG. 2 is a diagram showing a specific example of each of separated planes in the first embodiment of the image processing apparatus according to the present invention.

FIG. 2 is a diagram showing a specific example of each of planes separated in the image processing apparatus according to a first embodiment of the present invention. In the first embodiment, a separating information plane, a character information plane and a picture information plane are produced from supplied image data. When one image contains characters "ABCDE" and a picture portion (a portion in a rectangle) as shown in (A) of FIG. 2, image data is separated into a character information plane composed of only the character "ABCDE" as shown in (C) of FIG. 2 and a picture information plane composed of a picture portion from which the character portion has been omitted as shown in (D) of FIG. 2.

Moreover, the separating information plane indicating image data is separated to the character information plane or the picture information plane is produced. The separating information plane is composed of data for selecting the character information plane for only a character portion, in particular, only a filled-in portion forming each segment of a character is selected and selecting the picture information plane for the other portions, as shown in (B) of FIG. 2. Therefore, in the example shown in FIGS. 2, (B) and (C) show the same data. In actual, the separating information plane shown in (B) of FIG. 2 is only required to have information with which the number of planes into which supplied image data is separated. The separating information plane may be composed of binary data for distinguishing character information plane and the picture information plane from each other. If the characters are color characters, the character information plane shown in (C) of FIG. 2 must include information about the color.

Since the supplied image is separated, a compressing method adaptable to character data can be applied to, for example, the character information plane and a compressing method adaptable to photograph data can be applied to the picture information plane. Therefore, the compressing ratio can be raised and excessive deterioration in the quality of the image can be prevented. When the resolution is converted by using an optimum resolution converting method for each plane, the quantity of data which must be transmitted can be reduced such that an influence is prevented.

Although the image is, in the foregoing example, separated into two types of images, which are a character portion and a picture portion, the picture portion may furthermore be separated into a photograph portion and a CG (Computer Graphic) image portion. In this case, the image is separated into three planes (four planes when the separating information plane is included) which are a character portion, a photograph portion and a CG portion. If the three plane structure is employed, the separating information plane may be used as the character information plane because the separating information plane includes edge information. Moreover, the other portion is separated into a character color information plane and a picture information plane. The thus-formed three plane structure may be employed. If characters are in one specific color, for example, black, the character color information plane is not employed in the foregoing case. In this case, a two plane structure is employed. As described above, the present invention is not limited to the number of planes into which the image is separated and the structure of each plane.

Figure 3:
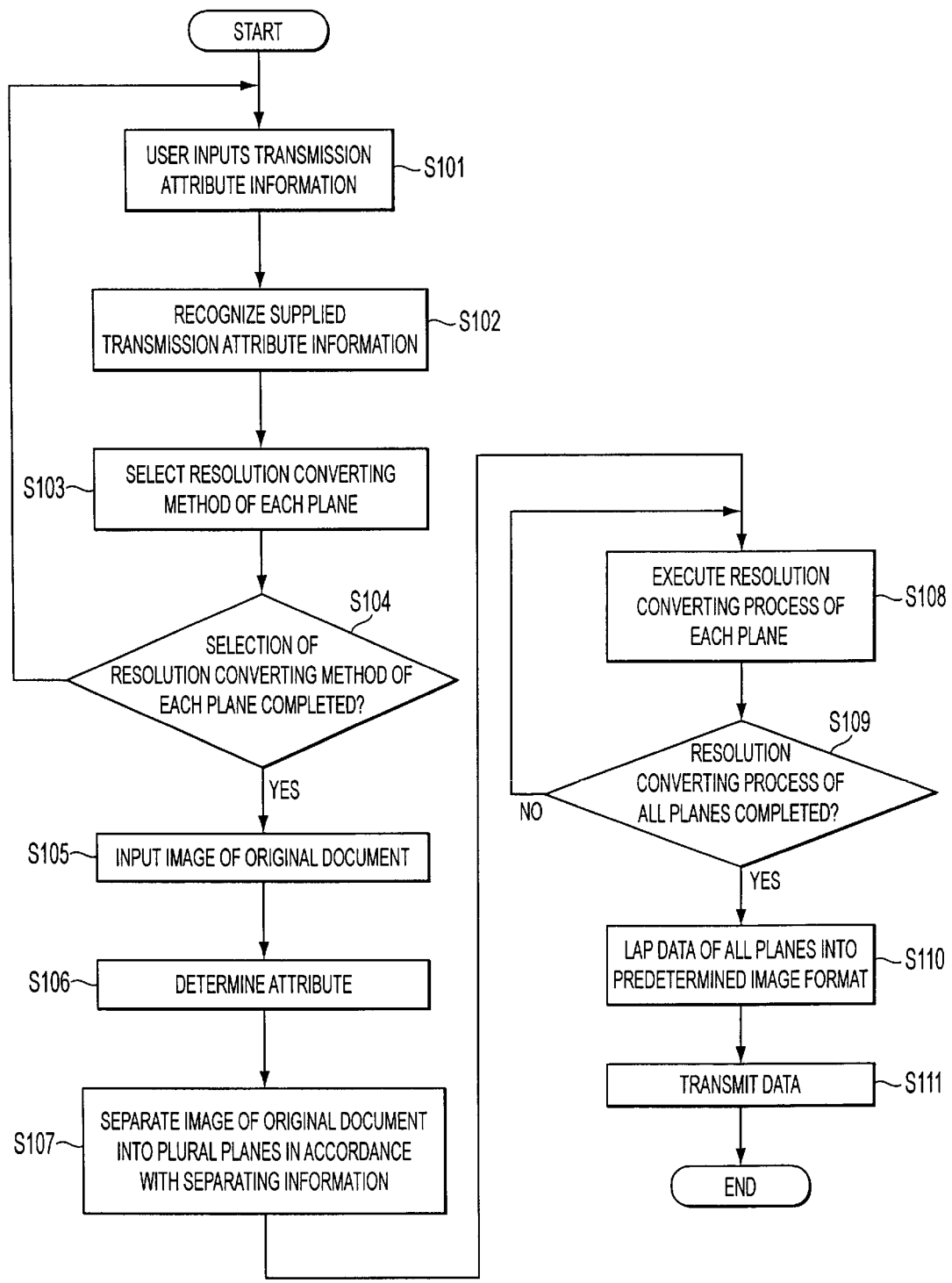
FIG. 3 is a flow chart showing an example of the operation of the first embodiment of the image processing apparatus according to the present invention.

FIG. 3 is a flow chart showing an example of the operation of the image processing apparatus according to a first embodiment of the present invention. Initially, in step S101, a user inputs transmission attribute information through a UI (User Interface). The transmission attribute information is parameter information which is instructed by the user when data is transmitted. For example, the parameter information is an instruction of the quality of the image which must be transmitted and an instruction of the transmission speed. FIG. 4 is a plan view showing an example of the user interface. In the example shown in FIG. 4, buttons are provided for selecting an image quality which must be transmitted from a standard mode, a high-quality mode and super high-quality mode. Among the provided modes, a required image quality can be instructed. The transmission speed may be selected from a standard mode, a high-speed mode and a very high-speed mode by using a corresponding button. Among the provided transmission speeds, a required transmission speed can be instructed.

The quality of the image which must be transmitted and the transmission speed are not limited to the three modes. Since the instruction of the quality of the image which must be transmitted and the instruction of the transmission speed have a relationship, they are not usually independently instructed. For example, an instruction may be performed from a limited number of combinations (modes), for example, "low speed and high image quality", "standard speed and standard image quality", "high speed and not excellent image quality" or the like.

The transmission attribute information may, of course, be information except for the transmission image quality and the transmission speed. For example, the type of an original document which must be transmitted may be instructed. In the example shown in FIG. 4, whether the original document is a character original document, a photograph original document or an original document having both character and photographs can be instructed. As an alternative to this, whether the original document is a color original document or a black and white original document can be instructed. As a matter of course, transmission of the transmission attribute information may be enabled. The resolution converting method for each plane may directly be instructed.

When input of transmission attribute information from the user has been completed, the transmission image quality and the transmission speed and the transmission attribute information, such as the type of the original document, instructed by the user are recognized by the transmission-attribute-information recognizing portion 14 in S102. In accordance with a result of recognition of the transmission attribute information, the transmission-attribute-information recognizing portion 14 determines the resolution converting method for the separating information plane, the character information plane and the picture information plane, the resolution conversion being performed by the resolution converting portion 15. Then, the transmission-attribute-information recognizing portion 14 produces a resolution converting method selection signal. In S103, the resolution converting portion 15 switches the selector for each plane in response to the selection signal produced in S102. Thus, an optimum resolution converting method for each plane is selected. At this time, conversion of the resolution may be omitted. Thus, setting may be performed such that conversion of the resolution for a certain plane is omitted.

The resolution converting methods provided for the resolution converting portion 15 are adapted to different algorithms (methods) to perform the resolution converting process. For example, the algorithms have characteristics such that a resolution converting method 1 is an algorithm with an excellent image quality cannot be realized and a high speed process can be performed, a resolution converting method 2 is an algorithm with which standard image quality and processing speed can be realized and a resolution converting method 3 is an algorithm with which a considerably high processing speed cannot be realized and a high image quality can be realized.

Figure 5:
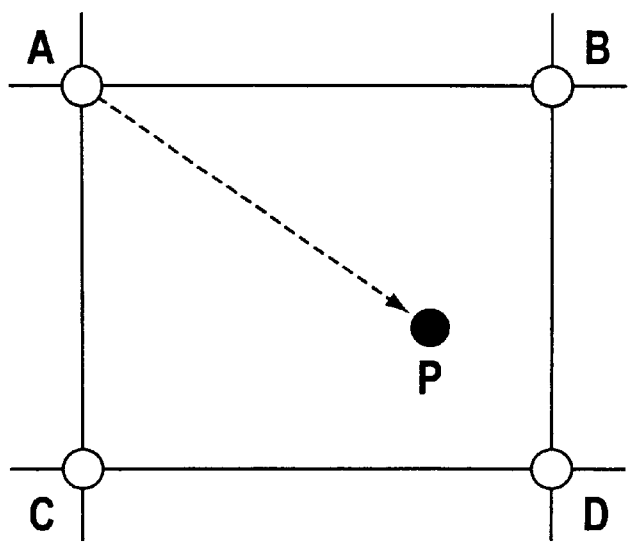
FIG. 5 is a diagram showing a zero-order hold method.

Some resolution converting methods will now be described. Initially, a zero-order hold method and a nearest neighbor method are resolution converting methods adaptable to a high speed process. FIG. 5 is a diagram showing the zero-order hold method. The zero-order hold method is an algorithm with which the value of output pixel P is, as shown in FIG. 5, made to be the value of input pixel A at a moment at the input pixel A has been supplied. The foregoing method is required to simply compare the positions of pixels and the necessity of calculating the pixel values can be eliminated. Therefore, the conversion of the resolution can significantly quickly be performed. However, the image quality which is realized after the conversion of the resolution is not excellent.

Figure 6:
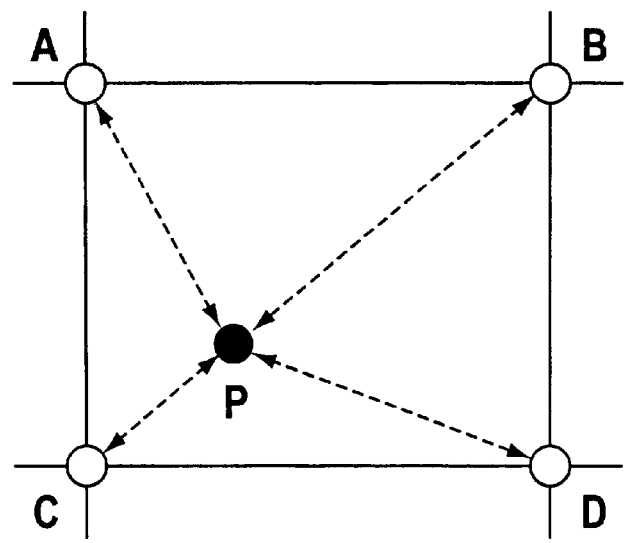
FIG. 6 is a diagram showing a nearest neighbor method.

FIG. 6 is a diagram showing the nearest neighbor method. The nearest neighbor method is an algorithm with which an output pixel P is replaced by a nearest input pixel. Referring to FIG. 6, the coordinates of the output pixel P and those of surrounding input pixels A, B, C and D are compared. The value of the nearest input pixel (which is an input pixel C shown in FIG. 6) is directly made to be the value of the output pixel P. With the foregoing method, the number of comparisons of the coordinates is enlarged as compared with the zero-hold method. Also the necessity of calculating the pixel values can be eliminated and thus the conversion of the resolution can quickly be performed. The image which is realized after the conversion of the resolution has been performed is not excellent because of occurrence of missing of a pixel when conversion to a low resolution is performed or because of unsatisfactory smoothness of the image when conversion to a high resolution is performed.

Figure 7:
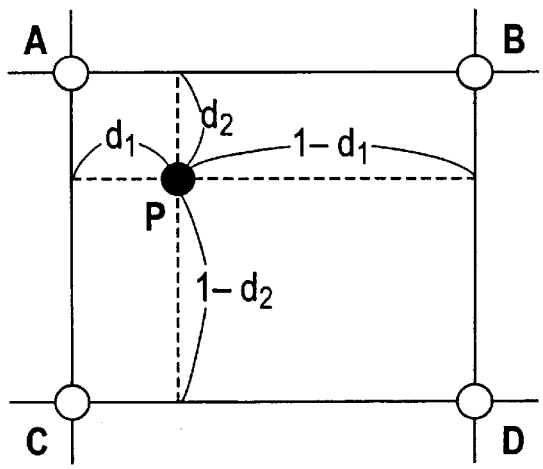
FIG. 7 is a diagram showing a four-point interpolation method.

An algorithm with which standard image quality and processing speed can be realized is a four-point interpolation method. FIG. 7 is a diagram showing the four-point interpolation method. The four-point interpolation method is an algorithm with which the output pixel P is interpolation-produced from four input pixels A, B, C and D around the output pixel P. As shown in FIG. 7, in accordance with differences d1 and d2 of X and Y coordinates of the output pixel P with respect to an input pixel A, the pixel value is calculated as follows:

$$P=(1-d1)\cdot(1-d2)\cdot A+d1\cdot(1-d2)\cdot B+(1-d1)\cdot d2\cdot C+d1\cdot d2\cdot D$$

Thus, the pixel value of the output pixel P is obtained. With the foregoing method, the quantity of calculation is not considerably enlarged and a relatively satisfactory image quality can be obtained. However, the realized image quality has somewhat problems, for example, a fine line cannot be formed and a somewhat pale image is formed.

Figure 8A:
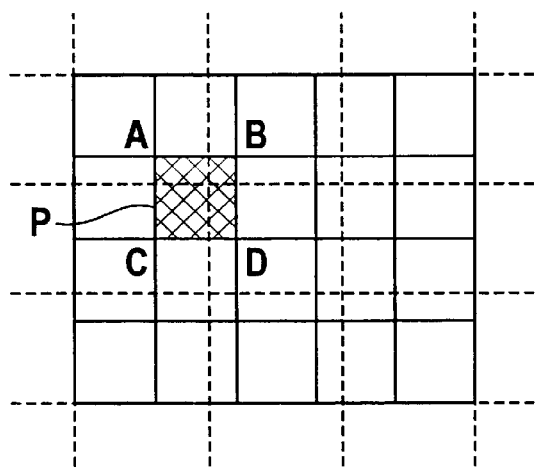
FIGS. 8A and 8B are diagram showing a projection method.
Figure 8B:
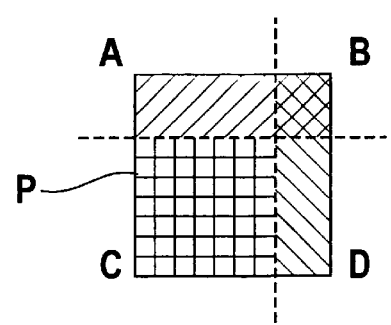

As algorithms capable of realizing an excellent image quality, a projection method, a sixteen-point interpolation method and a logical calculation method may be employed. FIG. 8 is a diagram showing the projection method. The projection method is an algorithm with which a pixel is not considered as a plane in place of considering the pixel as a point. Thus, the output pixel is determined in accordance with an area ratio of a plurality of input pixels. Referring to FIG. 8A, a dashed line indicates a 3×3 input image and a sold line indicates a 5×4 output image. Referring to FIG. 8A, the pixel value of the hatched output pixel P is determined. An assumption is made that the output pixel P is placed over the input pixels A, B, C and D. At this time, as shown in FIG. 8B, areas in which the output pixel P is included in the input pixels A, B, C and D are obtained. The areas are 2/9, 1/9, 4/9 and 2/9. In accordance with the obtained areas, the pixel value of the output pixel P is obtained such that P=2/9×A+ 1/9×B+4/9×C+2/9×D. With the foregoing method, a large quantity of calculations is required because the areas must be calculated. Therefore, the processing speed is somewhat lowered and an excellent image quality can be realized. In particular, a satisfactory effect can be obtained when a picture, such as a photograph, is treated. However, characters and lines sometimes encounter fading of edges.

FIG. 9 is a diagram showing the sixteen-point interpolation method. The sixteen-point interpolation method is an algorithm with which an output pixel is as it is interpolation-produced from sixteen surrounding input pixels. As shown in FIG. 9, pixel values of sixteen input pixels P11 to P44 around the output pixel P and differences x1 to x4 and y1 to y4 which are difference between the X and Y coordinates of the input pixels and the X and Y coordinate of the output pixel P are used:

$$P = \{f(y_1) \; f(y_2) \; f(y_3) \; f(y_4)\} \begin{bmatrix} P_{11} & P_{12} & P_{13} & P_{14} \\ P_{21} & P_{22} & P_{23} & P_{24} \\ P_{31} & P_{32} & P_{33} & P_{34} \\ P_{41} & P_{42} & P_{43} & P_{44} \end{bmatrix} \begin{bmatrix} f(x_1) \\ f(x_2) \\ f(x_3) \\ f(x_4) \end{bmatrix} \quad \text{[Expression 1]}$$

where $f(t)=\sin(\pi t)/(\pi t)$

Then, the foregoing calculation is performed so that the pixel value of the output pixel P is obtained. Although a long time takes with the foregoing method, the most significant image quality can be realized.

FIG. 10 is a diagram showing an example of the logical calculation method. The logical calculation method is a method with which a plurality of prepared pixel patterns and a region having a predetermined size are compared with each other. Then, an output of a predetermined pixel pattern is produced in accordance with whether the patterns coincide with each other. When conversion to a resolution of, for example, 1.5 times is performed, a 3×3 pixel is generated from a 2×2 pixel. Specifically, when a 2×2 pixel pattern as shown in FIG. 10A is detected, conversion to a 3×3 pixel as shown in FIG. 10B is performed. The logical calculation method is a resolution converting method effective for a binary line image.

In S102 shown in FIG. 3, the characteristics of the foregoing resolution converting methods and those of the planes are considered to determine a resolution converting method for each plane in accordance with the supplied transmission attribute information. The determined method is selected in S103.

In S104 completion of selection of the resolution converting method for each plane is confirmed, and then an image of the original document is received from, for example, the scanner portion 11 in S105. As a matter of course, an image transmitted from a digital camera or an image transmitted through a network may be received. The attribute of supplied image data is, in S106, determined in units of one to several pixels or that of each of a predetermined region of supplied generated is determined. An output of the attribute is produced as separating information. In this embodiment, the attribute-determining portion 12 determines a certain pixel of interest whether the attribute is a character image attribute or a picture image attribute. In actual, whether a certain pixel of interest is edge information (a high frequency image) or a non-edge information (a low frequency image) is determined. A pixel determined as edge information is identified as a character image attribute, while a pixel determined as non-edge information is identified as a picture image attribute.

The determination of the attribute may be performed in units of one pixel or several pixels or the attribute of each predetermined region (a block) may be determined. The method is not limited particularly. A multiplicity of attribute determining methods are disclosed, for example, a method disclosed in, for example, the Unexamined Japanese Patent Application Publication No. Hei 3-126180 or that disclosed in the Unexamined Japanese Patent Application Publication No. Hei 4-105178. The method is not limited particularly.

Separating information transmitted from the attribute-determining portion 12 is supplied to the two-layer separating portion 13, while the same is, as it is, transmitted to the resolution converting portion 15 as data of the separating information plane. In S107 the two-layer separating portion 13 separates the image of the original document into the character information plane and the picture information plane in accordance with supplied image of the original document and separating information.

A case can be considered in which the image of the original document supplied in S105 is an image to which tag information and header information have been added and the attribute of which has clearly been separated. In the foregoing case, the attribute-determining portion 12 is required to produce a separating information plane from tag information, header information and image data in S106. In S107 the two-layer separating portion 13 is required to perform, for example, format conversion to produce each plane.

The produced character information plane and picture information plane are supplied to the resolution converting portion 15. In S108 the separating information plane, the character information plane and the picture information plane are subjected to the resolution converting processes by the resolution converting methods previously selected in S103. Although the resolution of the converted plane is arbitrary, the resolution is set to a resolution which has been determined under a predetermined condition. There is a case where the omission of the resolution conversion of a plane has been selected. For example, the separating information plane may be omitted from the resolution conversion process. Only the character information plane and the picture information plane may be subjected to the resolution conversion processes. The other combinations may be employed.

In S109 completion of the resolution conversion process for each plane is confirmed, and then image data of each plane, the resolution of which has been converted (a plane, the resolution of which has not been converted, is included) is, in S110, transmitted to the image-format-lapping portion 16. The image-format-lapping portion 16 converts the three planes into a predetermined image format. As a result, the image-format-lapping portion 16 produces one image file. Although a standard and usual image format may be employed, the image format is not limited particularly. A peculiar image format produced by adding a variety of headers and so forth may be employed. FIG. 11 is a diagram showing an example of the image format. As shown in, for example, FIG. 11, a header for each plane is added to compressed data of each plane and a header of the overall portion is added so that a format which may be employed is produced. In the foregoing case, it is preferable that information about the resolution of each plane is inserted into the head of each plane or the overall header portion. Similarly, a color space, the number of gray scale levels and a compressing method of each plane may be inserted. Note that the compressing method for each plane is arbitrary and thus a compressing method adaptable to the characteristic of each plane may be employed. For example, it is preferable that a reversible compressing method, such as MH, MR, MMR or arithmetic coding method, adaptable to binary data is employed for the separating information plane. It is preferable that a method of compressing a color image, for example, JPEG, is employed for the character information plane and the picture information plane.

Formatted image data produced by the image-format-lapping portion 16 is transmitted to the transmitting portion 17. In S111 the transmitting portion 17 transmits formatted image data transmitted from the image-format-lapping portion 16 to a required apparatus through the network 2. As a method of instructing a receiving-side apparatus when transmission is performed, a salutation manager (SLM) protocol may be employed to instruct an apparatus from a plurality of receiving-side apparatuses. As an alternative to this, when a public telephone line is used as a facsimile line, the telephone number of the receiving-side apparatus may be input. Another method may be employed to instruct the receiving-side apparatus. That is, the instructing method is not limited particularly. The receiving-side apparatus is required to have at least a function of receiving transmitted image data. In a case where the receiver is an apparatus of a type, for example, a relay, which does not directly treat image data, the receiving-side apparatus is not required to understand the format of image data.

As described above, the first embodiment enables the resolution converting method for each plane to be selected in accordance with transmission attribute information supplied from a user. Thus, image transmission of a type which meets a requirement from the user can be performed. Since an optimum resolution conversion process for each plane is performed by separating supplied image data into the planes, the image quality can be improved and/or transmission period of time can be shortened as compared with the conventional collective resolution conversion process.

Figure 12:
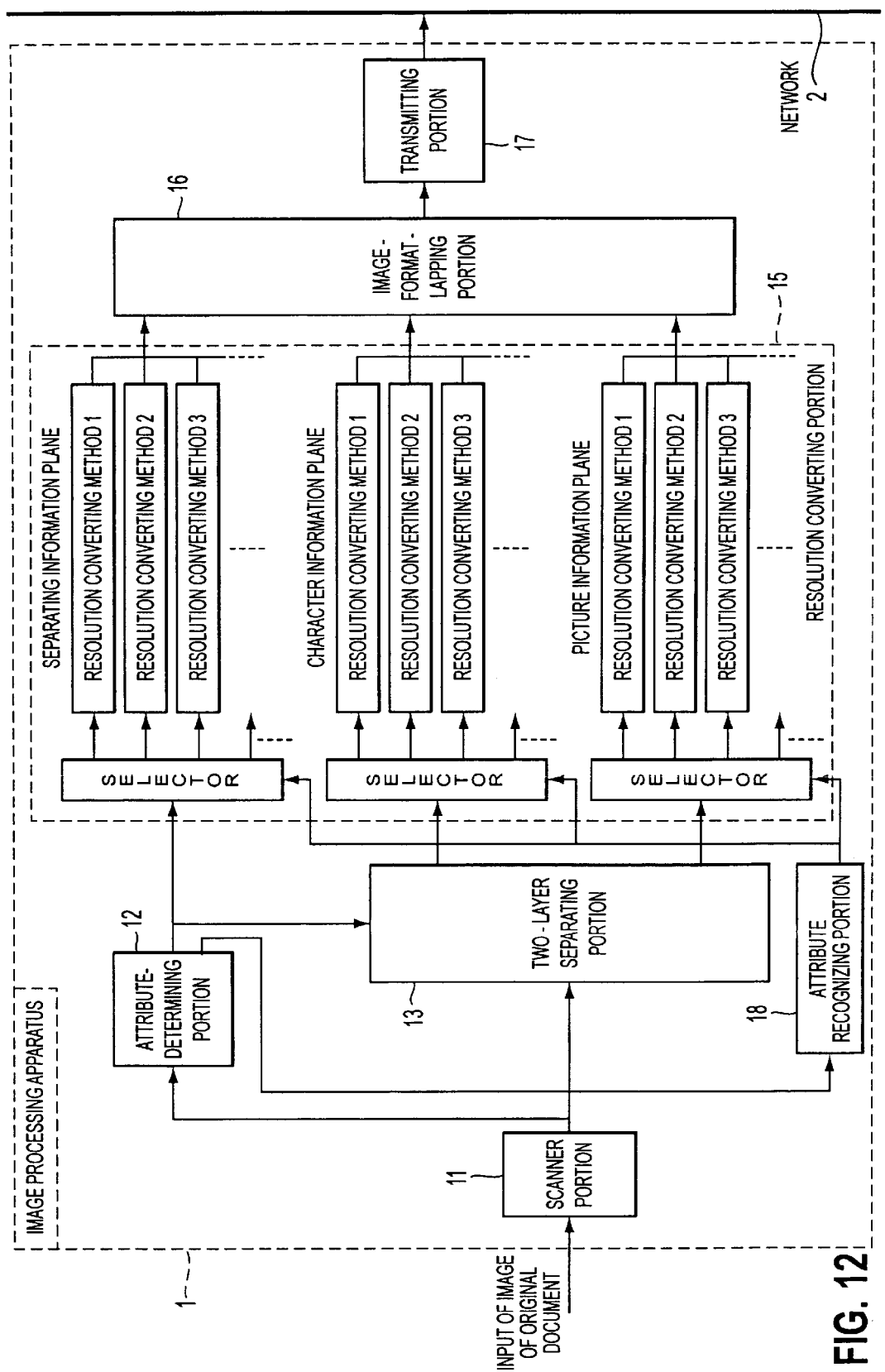
FIG. 12 is a diagram showing the structure of a second embodiment of the image processing apparatus according to the present invention.

FIG. 12 is a diagram showing the structure of a second embodiment of the image processing apparatus according to the present invention. In FIG. 12, the same elements as those shown in FIG. 1 are given the same reference numerals and the same elements are omitted from description. Reference numeral 18 represents an attribute recognizing portion. In this embodiment, the transmission attribute is not instructed from a user. The transmission attribute is determined in accordance with a supplied image.

In accordance with attribute information transmitted from the attribute-determining portion 12, the attribute recognizing portion 18 recognizes whether or not the supplied original document is composed of only characters, whether or not the same is composed of only photographs and whether or not the same is composed of characters and photographs. For example, the attribute may be determined in accordance with the ratio of character or pictures in the original document. Moreover, the image quality may furthermore be recognized whether or not the image is an image having clear edges or faded edges. In addition to the attribute of the image, for example, the size of the original document may be recognized. As described above, a structure may be employed which recognizes a variety of information for selecting the resolution converting method.

The resolution converting portion 15 uses the resolution converting method selected by the attribute recognizing portion 18 to convert the resolution of the separating information plane, the character information plane and the picture information plane. For example, FIG. 12 shows a separating information plane 21 having at least resolution converting methods 21-1, 21-2, 21-3; a character information plane having at least resolution converting methods 22-1, 22-2, 22-3; and a picture information plane having at least resolution converting methods 23-1, 23-2, and 23-3. An independent resolution converting method may be selected for each plane. As a matter of course, omission of the resolution conversion may be selected. An independent and arbitrary magnification may be set for each plane.

Figure 13:
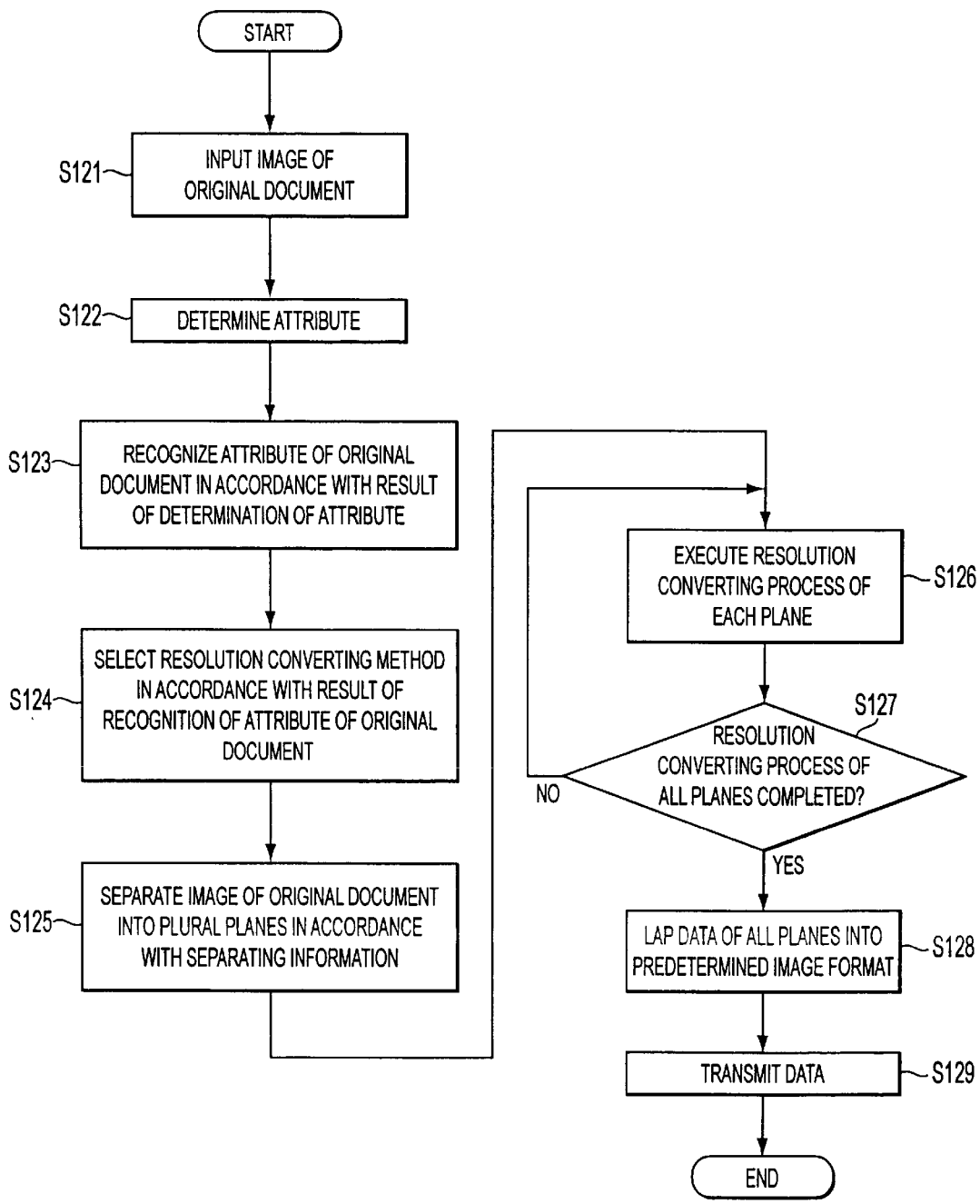
FIG. 13 is a flow chart showing an example of the operation of the second embodiment of the image processing apparatus according to the present invention.

FIG. 13 is a flow chart showing an example of the operation of the image processing apparatus according to the second embodiment of the present invention. In this flow chart, S121 and S122 are the same processes as S105 and S106 according to the first embodiment shown in FIG. 3. That is, in S121 an image of the original document is supplied. In S122 the attribute-determining portion 12 determines the attribute of one to several pixels or a predetermined region so as to produce an output of separating information. Note that the foregoing processes are omitted from detailed description.

In S123 the attribute recognizing portion 18 obtains attribute information whether or not the input original document is composed of only character, whether or not the same is composed of only photographs and whether or not the same is composed of both of character and photographs in accordance with separating information transmitted from the attribute-determining portion 12. As a matter of course, attribute information may be other than the three types of classifications which are "only characters", "only pictures" and "characters and pictures". The ratio of characters and pictures in the original document, the image quality and the size of the original document may be obtained. If the image of the original document is obtained through, for example, a network, there is a case where the attribute of each page is sometimes added to the header. In this case, a reference to the header may be made to obtain the overall page.

The attribute recognizing portion 18 recognizes the attribute of the image of the original document, and then produces a selection signal for selecting a resolution converting method in the resolution converting portion 15 for each of the separating information plane, the character information plane and the picture information plane. In S124 the resolution converting portion 15 switches the selector for each plane in response to each selection signal so that a resolution converting method corresponding to each plane is selected. At this time, there is a case where selection that the resolution conversion is not performed is made.

In the second embodiment, if the supplied image of the original document is determined as an image composed of only characters by the attribute recognizing portion 18, only null data exists in the picture information plane. As a result, only the character information plane is required to be transmitted. Therefore, even if a resolution converting method with which an excellent image quality may be adapted to the character information plane, the process load can be reduced. Thus, the resolution converting process of realizing an excellent image can quickly be performed. Also in a case where the image of the original document is determined as an image composed of only pictures, only null data exists in the character information plane. As a result, only the picture information plane is required to be transmitted. Therefore, even if the resolution converting method for maintaining an excellent image quality is employed to treat the picture information plane, the process load can be reduced. Thus, the excellent image resolution converting process can quickly be performed. If the original document is determined as an image having both of characters and pictures, for example, a standard resolution converting method is employed for each of the three planes. Thus, the resolution conversion can be performed with which a standard image quality can be realized at somewhat satisfactorily high speed.

Therefore, if the image of the original document is recognized as an image composed of only characters, a high image quality method, such as the logical calculation method, is selected as the resolution converting method for the character information plane. If the image of the original document is recognized as an image composed of only pictures, a high image quality method, such as the projection method or the sixteen-point interpolation method, is selected as the resolution converting method for the picture information plane. If the image of the original document is recognized as an image having both of characters and pictures, a standard method, for example, the four-point interpolation method is selected as the resolution converting method for all of the planes. As a matter of course, the resolution converting methods for the foregoing cases are not limited to the foregoing methods.

Since processes in S125 to S129 are the same as those in S107 to S111 according to the first embodiment shown in FIG. 3, the same processes are omitted from description.

As described above, the second embodiment enables the attribute to be recognized from the supplied original document so as to select the resolution converting method for each plane in accordance with the recognized attribute of the original document. Thus, a resolution converting process adaptable to the attribute of the original document can be performed to transmit the image.

Figure 14:
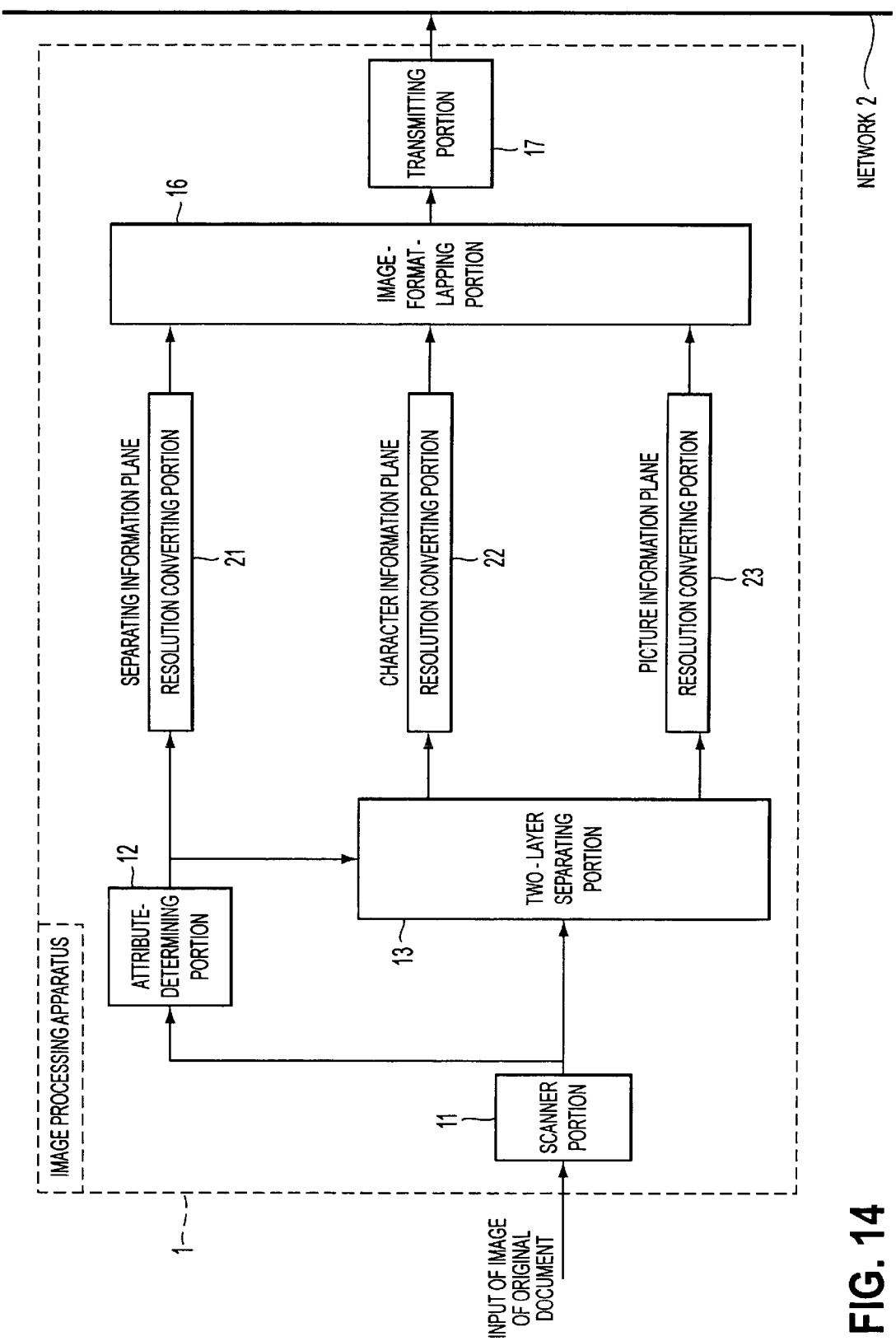
FIG. 14 is a diagram showing the structure of a third embodiment of the image processing apparatus according to the present invention.

FIG. 14 is a diagram showing the structure of a third embodiment of the image processing apparatus according to the present invention. In FIG. 14, the same elements as those shown in FIG. 1 are given the same reference numerals and the same elements are omitted from description. Reference numerals 21 to 23 represent resolution converting portions. In this embodiment, an optimum resolution converting method is employed for each plane so as to perform the resolution conversion process.

Separating information transmitted from the attribute-determining portion 12 is supplied to the resolution converting portion 21 as data of the separating information plane. The character information plane separated by the two-layer separating portion 13 is supplied to the resolution converting portion 22, while the picture information plane is supplied to the resolution converting portion 23.

The resolution converting portion 21 employs a resolution converting method adaptable to the separating information plane to subject the separating information plane to a resolution converting process. Similarly, the resolution converting portion 22 employs a resolution converting method adaptable to the character information plane so as to subject the character information plane to a resolution converting process. The resolution converting portion 23 employs a resolution converting method adaptable to the picture information plane so as to subject the picture information plane to a resolution converting process. The resolution converting portions 21 to 23 may employ different resolution converting methods or two or three same resolution converting methods. A resolution converting portion which does not perform the resolution conversion may exist. The resolution converting portions 21 to 23 are able to independently set arbitrary magnifications.

As resolution converting methods adaptable to the resolution converting portions 21 to 23, for example, a sixteen-point interpolation method may be employed for the resolution converting portion 21 for subjecting the separating information plane to the resolution conversion. The logical calculation method may be employed for the resolution converting portion 22 for subjecting the character information plane to the resolution conversion. The projection method may be employed for the resolution converting portion 23 for subjecting the picture information plane to the resolution conversion. The combinations are not limited to the foregoing combinations. The combination may be performed arbitrarily.

In this embodiment, the two-layer separating portion 13 separates the image data into two planes which are the character information plane and the picture information plane. Moreover, the three resolution converting portions corresponding to the three planes including the character information plane are provided. When the number of the planes is increased or decreased, the resolution converting portions are required to be increased or decreased to correspond to the planes. If the structures of the planes are different, resolution converting portions adapted to the resolution converting methods corresponding to the planes are required to be provided.

The image-format-lapping portion 16 converts, into a predetermined image format, the three planes which are the separating information plane, the character information plane and the picture information plane transmitted from the resolution converting portions 21 to 23 and subjected to the resolution converting processes. Then, the image-format-lapping portion 16 transmits the planes in the predetermined image format.

Figure 15:
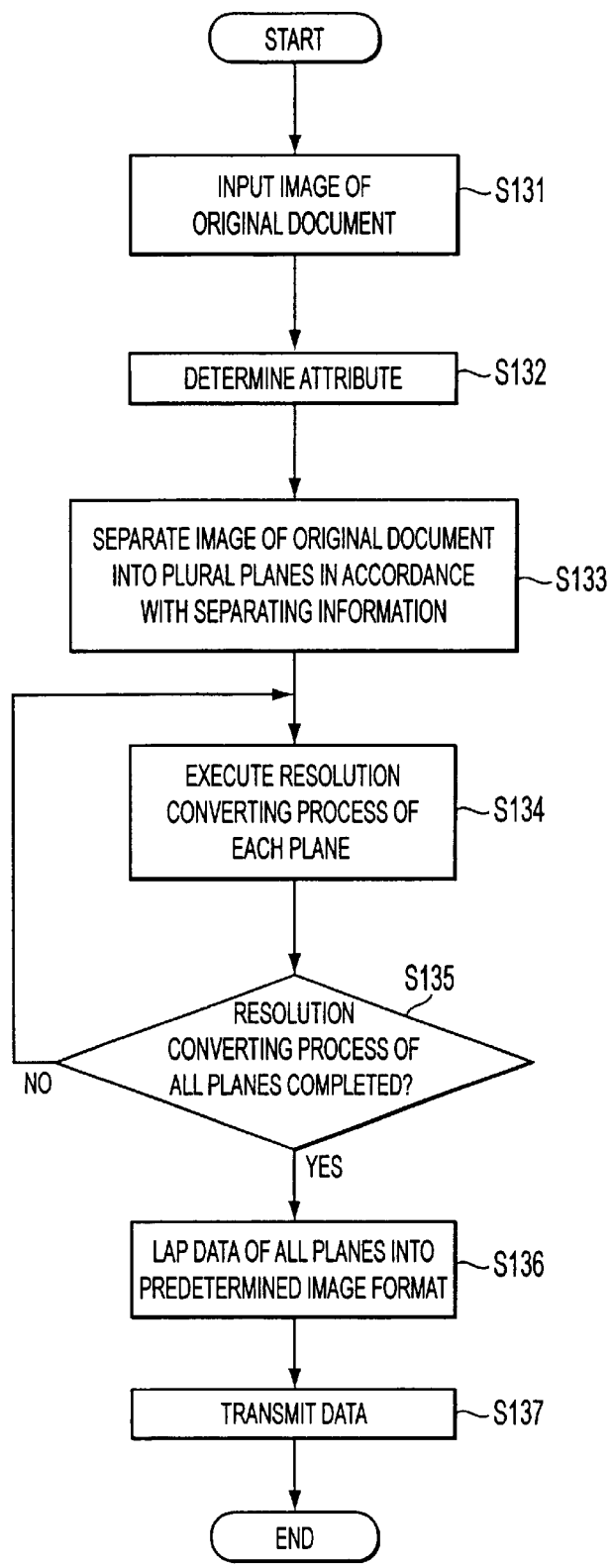
FIG. 15 is a flow chart showing an example of the operation of the third embodiment of the image processing apparatus according to the present invention.

FIG. 15 is a flow chart showing an example of the operation of the image processing apparatus according to the third embodiment of the present invention. An example of the operation shown in FIG. 15 is composed of steps S121, S122 and S125 to S129 of the steps according to the second embodiment shown in FIG. 13. The foregoing steps correspond to S131 to S137. Characteristic portion of the third embodiment will now be described. Since the other portions are similar to those of the second embodiment, the similar portions will schematically be described below.

In S131 an image of the original document is received. In S132 the attribute-determining portion 12 determines the attribute of one or more pixels of the image or each of predetermined regions of the image of the original document so that separating information is transmitted. The transmitted separating information is transmitted to the two-layer separating portion 13. On the other hand, separating information is, as the separating information plane, transmitted to the resolution converting portion 21 for the separating information plane.

In S133 the two-layer separating portion 13 separates the image of the original document into the character information plane and the picture information plane in accordance with separating information transmitted from the attribute-determining portion 12. The separated character information plane and the picture information plane are transmitted to the resolution converting portion 22 for the character information plane and the resolution converting portion 23 for the picture information plane.

In S134 the three planes, which are the separating information plane, the character information plane and the picture information plane are subjected to the resolution converting processes using the prepared resolution converting methods by the resolution converting portions 21, 22 and 23. Note that the resolutions to which the conversion is performed by the resolution converting portions 21 to 23 are previously determined in accordance with a predetermined condition. A certain resolution converting portion is permitted not to perform the resolution conversion.

After completion of the resolution converting processes of the planes by the resolution converting portions 21 to 23 has been confirmed in S135, image data of each plane subjected to the resolution conversion is transmitted to the image-format-lapping portion 16. In S136 the image-format-lapping portion 16 converts the three planes into a predetermined image format. As a result, the image-format-lapping portion 16 produces one image file. In S137 the image data in the predetermined image format is transmitted from the transmitting portion 17 to a required apparatus through the network 2.

As described above, the third embodiment has the structure in which the supplied image of the original document is separated into a plurality of planes. Thus, a predetermined optimum resolution converting method for each plane is used to perform the resolution conversion. Since the supplied image of the original document is decomposed into the planes in accordance with the attribute of the portion, an resolution converting process corresponding to the attribute of the portion of the image can be performed so as to transmit the image.

Figure 16:
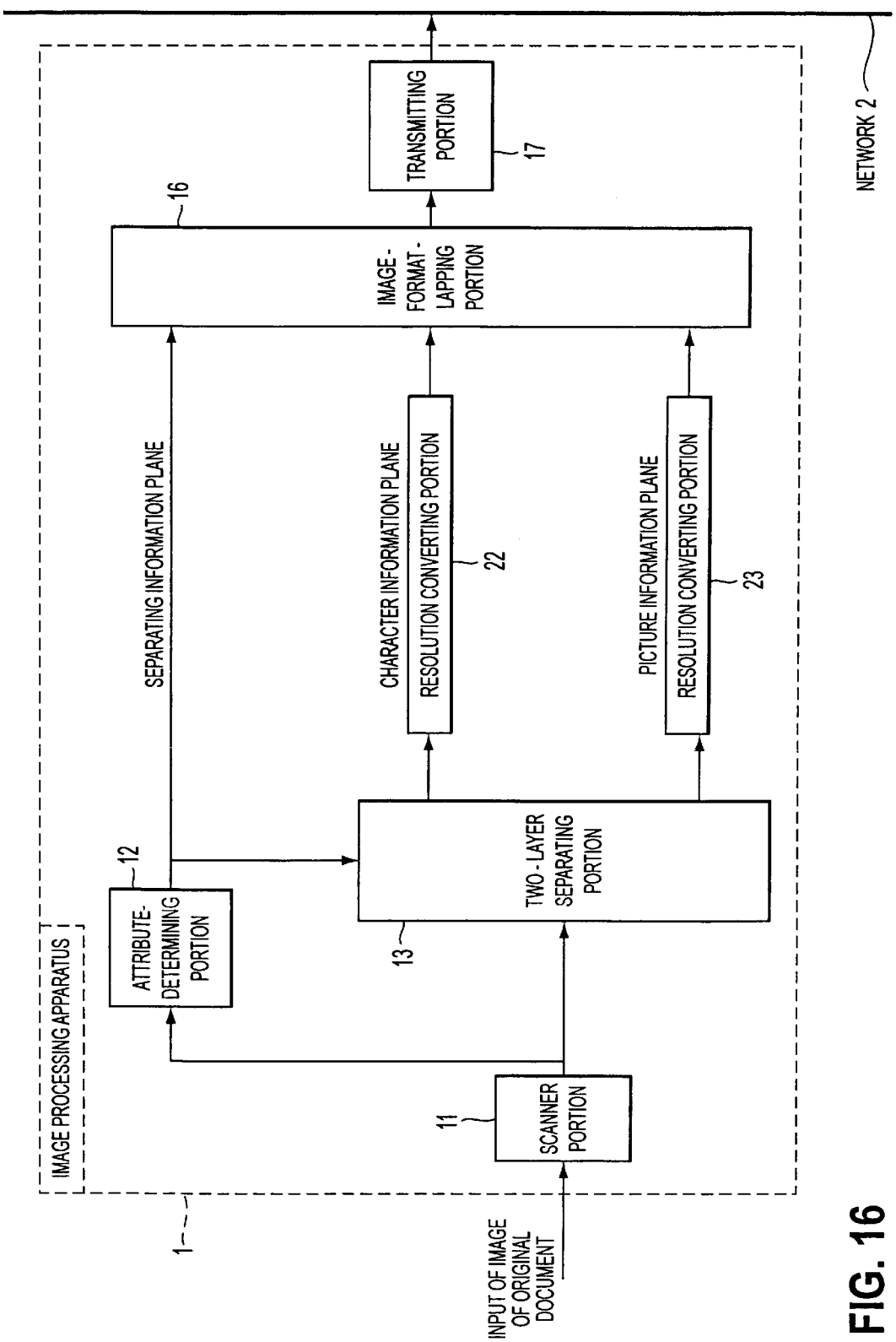
FIG. 16 is a diagram showing the structure of a fourth embodiment of the image processing apparatus according to the present invention.

FIG. 16 is a diagram showing the structure of a fourth embodiment of the image processing apparatus according to the present invention. In the drawing, the same elements as those shown in FIG. 14 are given the same reference numerals and the same elements are omitted from description. The fourth embodiment is substantially the same as the third embodiment. However, the separating information plane is arranged to have the resolution of the image of the original document. That is, the resolution conversion is omitted and then the separating information plane is transmitted.

The attribute-determining portion 12 extracts a characteristic quantity of the supplied image of the original document so as to produce separating information in pixel units. Therefore, the separating information plane composed of separating information has the same resolution as that of the image of the original document. The separating information plane is not subjected to the resolution conversion and the same is as it is transmitted to the image-format-lapping portion 16.

Since the separating information plane is transmitted with the same resolution as that of the image of the original document as described above, synthesis of images which is performed by the receiving side apparatus can be performed such that a character image or a picture image is switched at the same resolution as that of the image of the original document. Therefore, a synthesized image having the excellent image quality in the switched portion can be formed. Since this embodiment has the structure that the separating information plane is used to select only two planes, only information of one bit for each pixel is required. Thus, the quantity of data can be reduced and a compressing method exhibiting a high compressing ratio can be employed. Therefore, if transmission is performed with performing the resolution conversion, long time is not required to complete transmission. Moreover, an image having an excellent image quality can be transmitted.

The resolution converting portions 22 and 23 are adapted to the same or individual resolution converting methods. Moreover, conversion to an arbitrary resolution is permitted. The resolution has been determined under a predetermined condition. For example, a method may be employed in which the resolution of the character information plane is raised and that of the picture information plane is lowered. As described above, the resolution can be varied for each plane. The converted resolution may be limited to 1/n (n is an integer not smaller than 2) of the resolution of the supplied image of the original document. In this example, the separating information plane is set to the resolution of the image of the original document, the character information plane and the picture information plane are transmitted at the resolution of 1/n. Thus, a switched portion can satisfactorily be reproduced when synthesis of the image is performed. As a result, a synthesized image having an excellent image quality can be formed. As a matter of course, all of the planes are connected to the same resolution. Another structure may be employed in which either of the character information plane or the picture information plane is not subjected to the resolution converting process.

The image-format-lapping portion 16 converts the three planes, which are the separating information plane transmitted from the attribute-determining portion 12 and the character information plane and the picture information plane subjected to the resolution converting processes in the resolution converting portions 22 and 23 into a predetermined image format so as to transmit the planes in the predetermined image format.

The operation of the fourth embodiment is arranged such that the attribute-determining portion 12 transmits separating information for each pixel. Moreover, the separating information plane is not subjected to the resolution converting process. The other portions are substantially the same as those of the third embodiment. Therefore, the similar portions are omitted from description.

The foregoing description has been performed about the structure in which the separating information plane is produced and the image of the original document is separated at the resolution of the supplied image of the original document. The structure is not limited to this. For example, a structure may be employed in which the resolution of the supplied image of the original document is temporarily be converted into another resolution. Then, the converted image is subjected to processes for separating the image and conversion of the resolution for each plane. In the foregoing case, the resolution of the separating information plane is made to be the resolution realized after the image of the original document has been converted. It is preferable that the resolution conversion to which the character information plane and the picture information plane are subjected is performed to, for example, 1/n of the resolution of the separating information plane.

As described above, the fourth embodiment has the structure that the separated planes are subjected to optimum resolution converting processes. Thus, the resolution conversion adaptable to the attribute of each portion of the image can be performed to transmit the image. Since the separating information plane is transmitted at the resolution of the image which has not been separated, an image having an excellent image quality can be synthesized.

Figure 17:
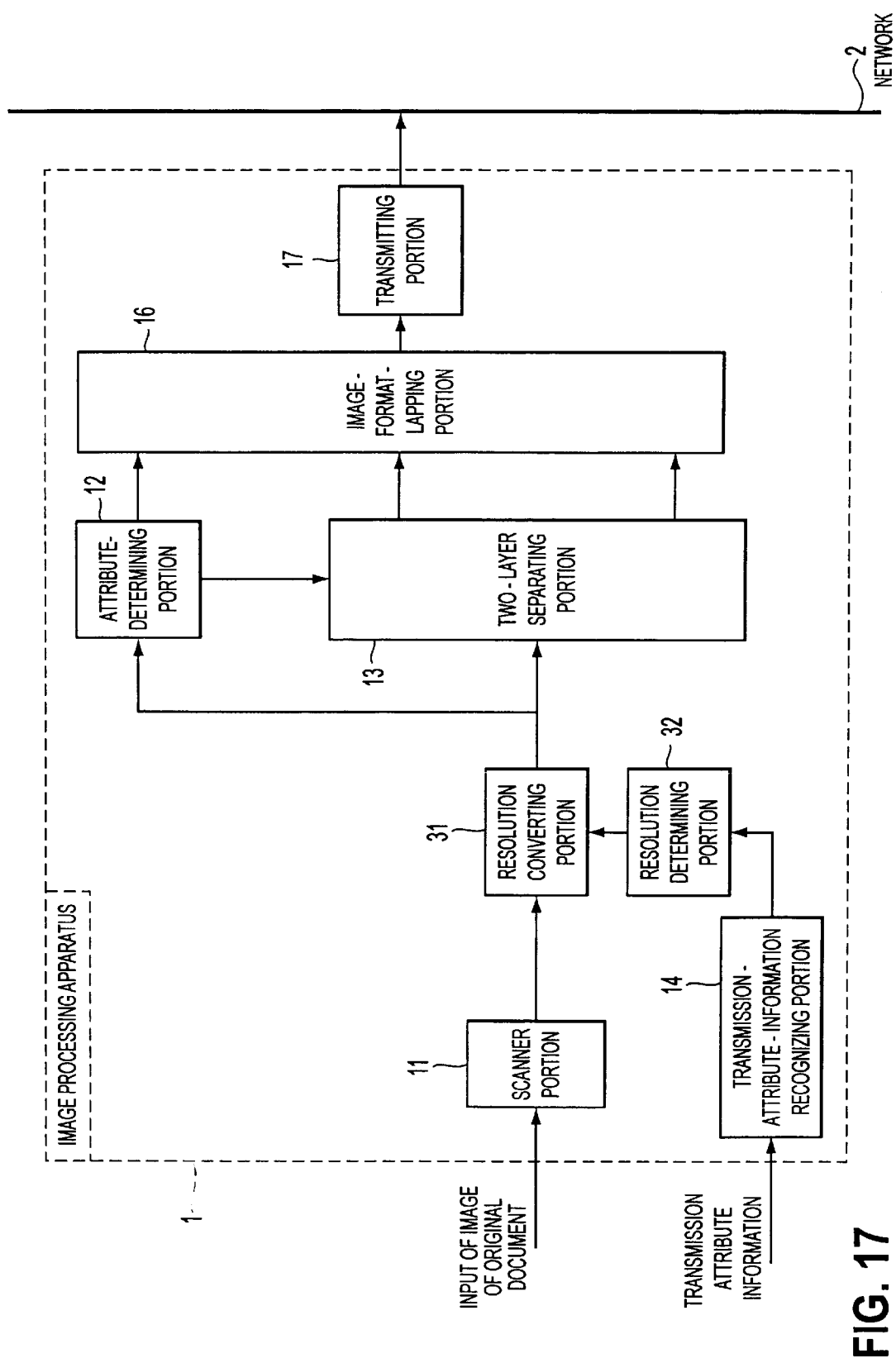
FIG. 17 is a diagram showing the structure of a fifth embodiment of the image processing apparatus according to the present invention.

FIG. 17 is a diagram showing the structure of a fifth embodiment of the image processing apparatus according to the present invention. In the drawing, similar elements to those shown in FIG. 1 are given the same reference numerals and the similar elements are omitted from description. Reference numeral 31 represents a resolution converting portion, and 32 represents a resolution determining portion. In the first to fourth embodiments, the supplied image of the original document is separated in accordance with the attribute of each portion. Then, the separated planes and the separating information plane are subjected to optimum resolution converting processes. In a special case, all of the planes are converted to the same resolution by using the same resolution converting method. In the foregoing case, the processing speed can be raised when the resolution conversion is collectively performed before separation to planes is performed as compared with the structure in which each plane is subjected to resolution conversion. The fifth embodiment is adaptable to the foregoing case such that the resolution conversion is collectively performed before separation to planes is performed. The fifth embodiment has a structure similar to that according to the first embodiment except for the position of the resolution converting portion. A structure adaptable to the structure of the other structure may be employed.

The resolution converting portion 31 employs a predetermined resolution converting method for a supplied image of the original document so as to convert the image of the original document to a resolution determined by the resolution determining portion 32. The attribute-determining portion 12 determines the attribute of image data subjected to the resolution conversion by the resolution converting portion 31 in units of one to several pixels or each of predetermined regions. The attribute-determining portion 12 transmits separating information to the two-layer separating portion 13. Moreover, the attribute-determining portion 12 transmits data of the separating information plane to the image-format-lapping portion 16. The two-layer separating portion 13 separates image data subjected to the resolution conversion by the resolution converting portion 31 into character information and picture information in accordance with separating information supplied from the attribute-determining portion 12 so as to supply information as data of the character information plane and the picture information plane to the image-format-lapping portion 16. The image-format-lapping portion 16 converts the three planes which are the separating information plane transmitted from the attribute-determining portion 12, the character information plane and the picture information plane separated by the two-layer separating portion 13 into image data in a predetermined image format so as to transmit the three planes in the predetermined image format.

The image-format-lapping portion 16 recognizes transmission attribute information supplied from a user so as to produce attribute information for determining a resolution. In accordance with attribute information transmitted from the image-format-lapping portion 16, the resolution determining portion 32 determines the resolution employed in the resolution conversion which is performed by the resolution converting portion 31. Another structure may be employed in a plurality of resolution converting methods are prepared in the resolution converting portion 31. Moreover, the resolution determining portion 32 determines the resolution converting method together with the resolution.

Figure 18:
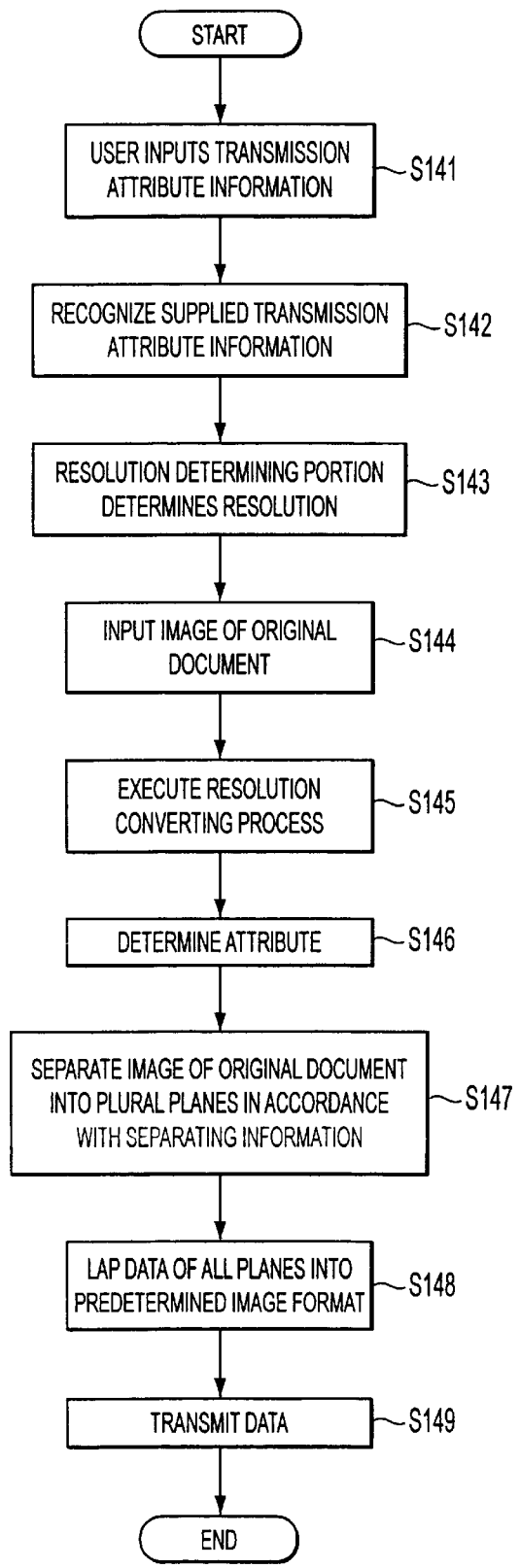
FIG. 18 is a flow chart showing an example of the operation of the fifth embodiment of the image processing apparatus according to the present invention.

FIG. 18 is a flow chart showing an example of the operation of the image processing apparatus according to a fifth embodiment of the present invention. Similarly to the first embodiment, in S141 a user inputs transmission attribute information. Transmission attribute information is input through, for example, a UI (User Interface) as shown in FIG. 4. Thus, a variety of methods may be employed. In S142 the transmission-attribute-information recognizing portion 14 recognizes transmission attribute information input by the user. In accordance with recognized transmission attribute information, the transmission-attribute-information recognizing portion 14 transmits a resolution switching signal to the resolution determining portion 32.

In S143 the resolution determining portion 32 selects one resolution from a plurality of predetermined resolutions. When a reading resolution of the scanner portion 11 is, for example, 400 dpi, the resolution determining portion 32 prepares three resolutions which are 400 dpi, 200 dpi and 100 dpi so that one resolution is selected from the three resolutions. When the reading resolution of the scanner portion 11 is 600 dpi, the resolution determining portion 32 prepares three resolutions, which are 600 dpi, 300 dpi and 150 dpi so that one resolution is selected from the three resolutions. If the image is not supplied from the scanner portion 11 and the same is in the form of a page description language, conversion to raster image data at a predetermined individual resolution may be performed. The resolution which must be employed is not limited to the three resolutions. A structure may be employed in which an arbitrary resolution can be set.

When the resolution has been determined by the resolution determining portion 32, the image of the original document is received in S144 similarly to S105 according to the first embodiment. In the fifth embodiment, the resolution converting portion 31 subjects the image of the original document input in S145 to the resolution converting process in accordance with the resolution determined by the resolution determining portion 32 before the image is separated. A variety of the resolution converting methods may be employed as described in the first embodiment. Therefore, the method is not limited particularly. As a matter of course, also the resolution converting method may be selected when the resolution determining portion 32 determines the resolution.

In S146 the attribute-determining portion 12 determines the attribute of the image subjected to the resolution converting method, the attribute being determined in units of one to several pixels or each predetermined region. Then, the attribute-determining portion 12 produces an output of separating information corresponding to the attribute. The method of determining the attribute is the same as that according to the first embodiment. Transmitted separating information is supplied to the two-layer separating portion 13. On the other hand, separating information is, as it is, transmitted to the image-format-lapping portion 16 as data of the separating information plane.

In S147 the two-layer separating portion 13 separates the image supplied from the resolution converting portion 31 and subjected to the resolution conversion, the separation being performed in accordance with separating information supplied from the attribute-determining portion 12. In this embodiment, the image subjected to the resolution conversion is separated into, for example, a character information plane and a picture information plane. As a matter of course, the separation method is not limited to that according to this embodiment. Each of the separated plane is, as it is, transmitted to the image-format-lapping portion 16.

In S148 the image-format-lapping portion 16 converts the supplied character information plane, the picture information plane and the separating information plane into a predetermined image format. As a result, the image-format-lapping portion 16 produces one image file. The image format may be any one of the various image formats, for example, as shown in FIG. 11.

In S149 image data formatted by the image-format-lapping portion 16 is supplied to the transmitting portion 17, and then transmitted to a required apparatus from the transmitting portion 17 through the network 2.

As described above, the fifth embodiment has the structure that the supplied image of the original document is subjected to the resolution converting process after which the image is separated into planes. Therefore, when each plane is converted into the same resolution, each plane is not subjected to the plane. Therefore, only one resolution converting process is required and thus the process load can be reduced.

Figure 19:
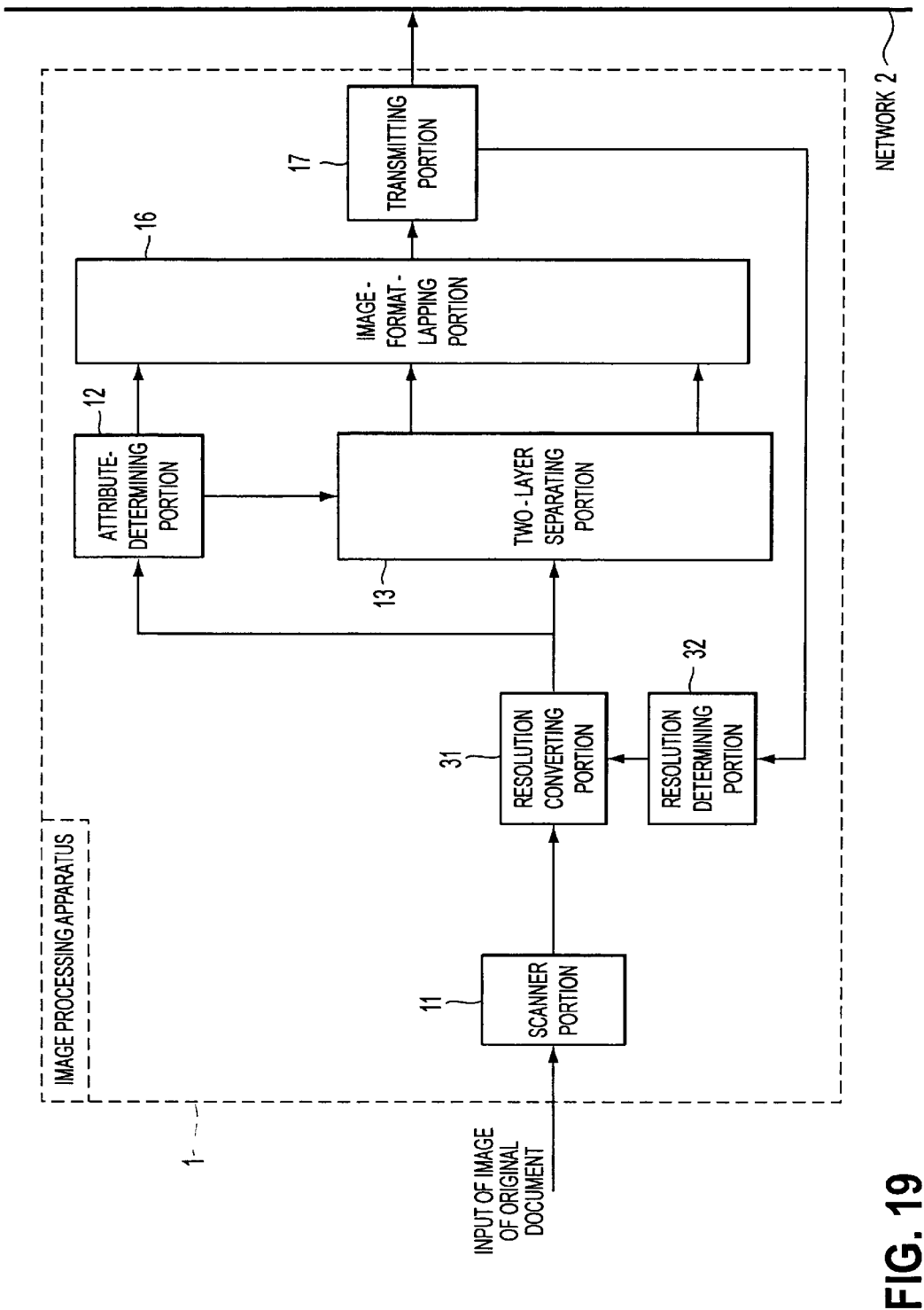
FIG. 19 is a diagram showing the structure of a sixth embodiment of the image processing apparatus according to the present invention.

FIG. 19 is a diagram showing the structure of a sixth embodiment of the image processing apparatus according to the present invention. In the drawing, similar elements to those shown in FIGS. 1 and 17 are given the same reference numerals and the similar elements are omitted from description. Also this embodiment has the structure similar to that of the fifth e in which the resolution converting process is performed before the image is separated. In the sixth embodiment, the resolution conversion is performed in accordance with the resolution set in communication with the receiving-side apparatus.

The transmitting portion 17 performs communication with a receiving-side apparatus to receive output resolution information and so forth so as to transmit the output resolution information and so forth to the resolution determining portion 32. Moreover., the transmitting portion 17 transmits, to the receiving-side apparatus, image data formatted by the image-format-lapping portion 16 through the network 2. In accordance with output resolution information of the receiving-side apparatus transmitted from the transmitting portion 17, the resolution determining portion 32 determines the resolution which is employed in the resolution converting process which is performed by the resolution converting portion 31. The resolution converting portion 31 performs the plane in accordance with the resolution determined by the resolution determining portion 32.

Figure 20:
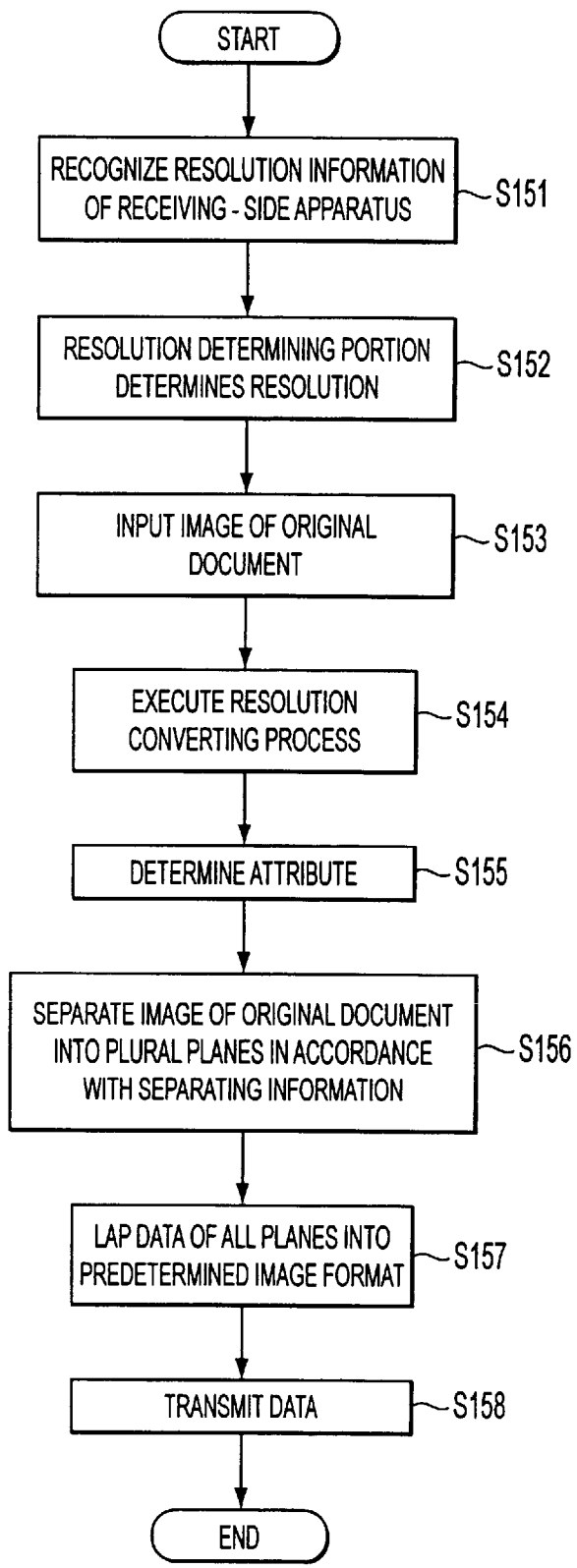
FIG. 20 is a flow chart showing an example of the operation of the sixth embodiment of the image processing apparatus according to the present invention.

FIG. 20 is a flow chart showing an example of the operation of the image processing apparatus according to the sixth embodiment of the present invention. In S151 the transmitting portion 17 makes an access to the receiving-side apparatus through the network 2 so as to make a request to the receiving-side apparatus to communicate output resolution information. The receiving-side apparatus receives the communication request of the output resolution information so as to communicate the output resolution information to the image processing apparatus 1. The transmitting portion 17 receives output resolution information from the receiving-side apparatus so as to transmit received output resolution information to the resolution determining portion 32. Then, an access to the receiving-side apparatus may be interrupted or paused.

The receiving-side apparatus may be instructed such that a user uses a UI (User Interface) to instruct the apparatus or software which is directly or indirectly used by the user may determines the same. As an alternative to this, the transmitting portion 17 may select one apparatus meeting a requirement from a plurality of receiving-side apparatuses by performing polling or the like. A salutation manager (SLM)

protocol may be employed to instruct an apparatus meeting a requirement among a plurality of receiving-side apparatuses. When a public telephone line is used as a facsimile line, the telephone number of the receiving-side apparatus may be input. Another method may be employed to instruct the receiving-side apparatus. As described above, the instructing method is not limited particularly.

Since processes from S152 are similar to those from S143 according to the fifth embodiment, the similar processes are omitted from description. Finally, in S158 formatted image data is transmitted to the receiving-side apparatus with which communication has been performed in S151.

As described above, also the sixth embodiment requires only one resolution converting process when each plane is converted into the same resolution because each plane is not subjected to the resolution converting process. Therefore, process load which must be borne by the transmission side apparatus can be reduced. Since the conversion process to a resolution which is adaptable to the receiving-side apparatus is performed, image data can be transmitted in a state adaptable to the receiving-side apparatus. If a receiving-side apparatus has a low resolution, the quantity of data which must be transmitted can be reduced to quickly perform data transmission.

Figure 21:
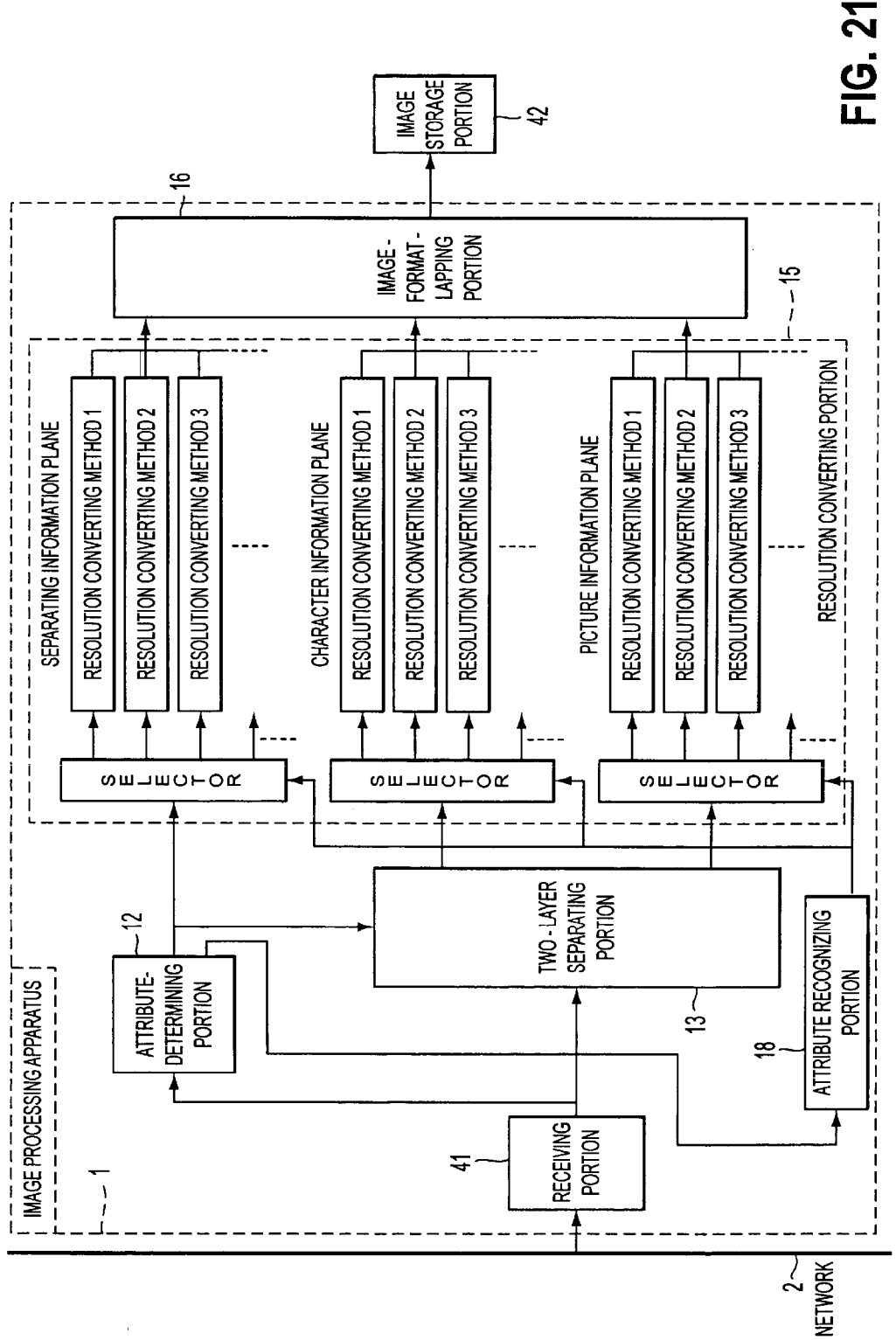
FIG. 21 is a diagram showing the structure of a seventh embodiment of the image processing apparatus according to the present invention.

FIG. 21 is a diagram showing the structure of a seventh embodiment of the image processing apparatus according to the present invention. In the drawing, similar elements to those shown in FIG. 12 are given the same reference numerals and the similar elements are omitted from description. Reference numeral 41 represents a receiving portion and 42 represents an image storage portion. In the foregoing embodiments, the transmission side image processing apparatus has been described with which an image is separated, and then the separated image is transmitted from the transmitting portion 17 through the network 2. As a matter of course, the present invention may be applied to a receiving-side apparatus. This embodiment is an example of the foregoing structure. The receiving portion 41 receives image data transmitted through the network 2 or the like. The image storage portion 42 stores image data formatted by the image-format-lapping portion 16. Stored image data can arbitrarily be read, again transmitted through the network 2 or transmitted to an exclusive output apparatus so as to be recorded.

The operation of the seventh embodiment is the same as those of the second embodiment shown in FIG. 13 except for a structure in which the receiving portion 41 receives image data so as to make it to be input image data, formatted image data is not transmitted and the same is stored in the image storage portion 42. Therefore, the operation is omitted from description. In this embodiment, the structure according to the second embodiment is applied to the receiving-side apparatus. The structure is not limited to this. The structure according to another embodiment may be applied to the receiving-side apparatus.

Figure 22:
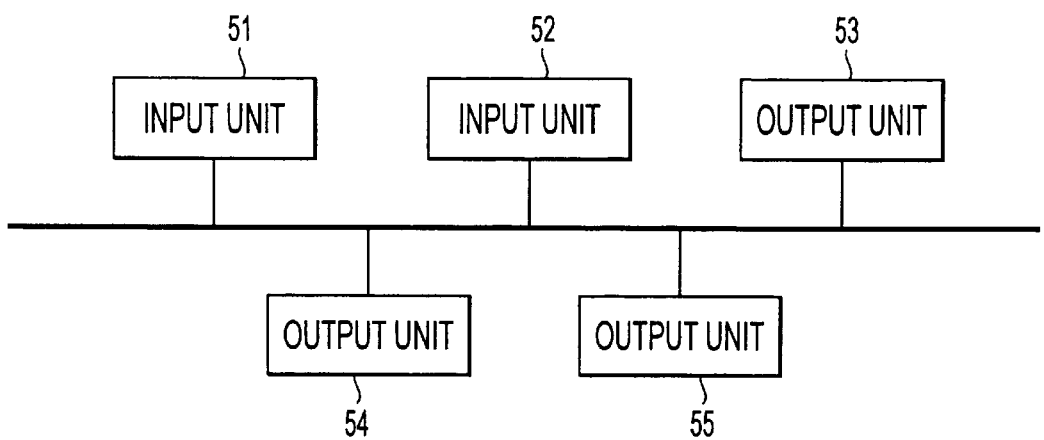
FIG. 22 is a diagram showing the structure of an example of a system incorporating the image processing apparatus according to the present invention.

FIG. 22 is a diagram showing an example of a system incorporating the image processing apparatus according to the present invention. Referring to the drawing, reference numerals 51 and 52 represent input units, 53 to 55 represent output units and 56 represents a network. The input units 51 and 52 are apparatuses on which the image processing apparatus according to any one of first to sixth embodiments of the present invention is mounted so as to fetch image data so as to transmit image data to any one of the output units 53 to 55 through the network 56. The output units 53 to 55 receive image data transmitted from the input unit 51 or 52 through the network 56 so as to record and produce an output of the same on a recording medium, such as paper or an OHP sheet. The network 56 comprises a network line, such as a public telephone line or a LAN.

Another structure may be employed in which the output units 53 to 55 are the image processing apparatus according to the seventh embodiment of the present invention. The input units 51 and 52 are image input units, such as scanners, to input images or apparatuses which produces images by a graphics function thereof to transmit the images. Although the embodiment shown in FIG. 22 has the structure that the functions of the input units and the output units are provided independently so as to easily be understood, each of the apparatuses may be a composite apparatus having both of the function of the input unit and that of the output unit.

Figure 23:
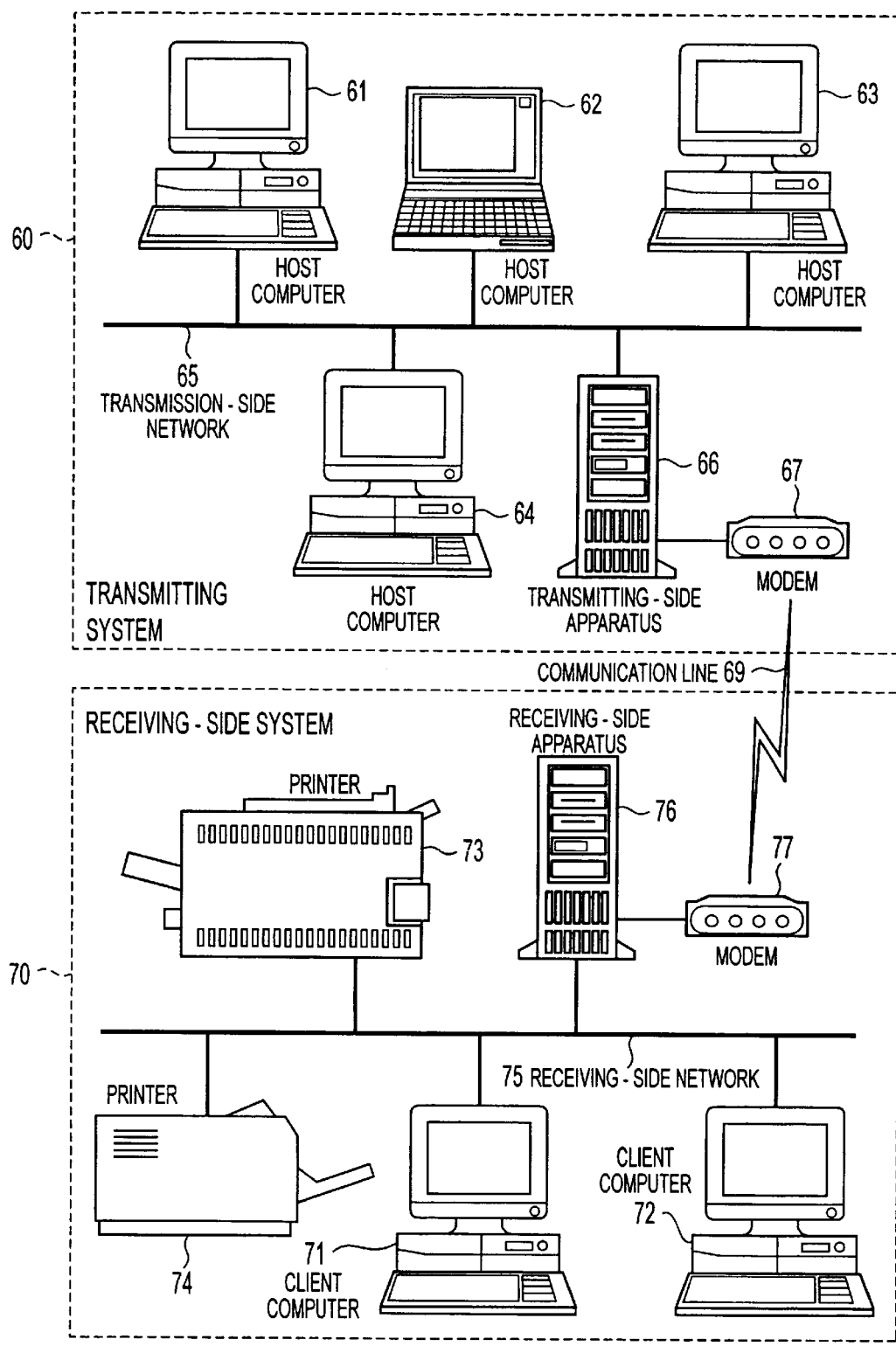
FIG. 23 is a diagram showing the structure of another example of the system incorporating the image processing apparatus according to the present invention.

FIG. 23 is a diagram showing another example of the system incorporating the image processing apparatus according to the present invention. In the drawing, reference numerals 61 to 64 represent host computers, 65 represents a transmission-side network, 66 represents a transmission-side apparatus, 67 represents a modem, 71 and 72 represent client computers, 73 and 74 represent printers, 75 represents a receiving-side network, 76 represents a receiving-side apparatus and 77 represents a modem. The transmission-side system 60 is a system in which the host computers 61 to 64, and the transmission-side apparatus 66 and so forth are connected through the transmission-side network 65. The modem 67 is connected to the transmission-side apparatus 66.

The transmission-side apparatus 66 has a structure according to any one of the first to sixth embodiments of the image processing apparatus according to the present invention. The transmission-side apparatus 66 directly receives image data from the host computers 61 to 64 connected to the transmission-side network 65 so as to subject image data to the image separation, the resolution conversion and the formatting process. Then, the image data is facsimile-transmitted to the receiving-side system 70 through the modem 67.

In the receiving-side system 70, the client computers 71 and 72, the printers 73 and 74 and the receiving-side apparatus 75 are connected through the receiving-side apparatus 75. The modem 77 is connected to the receiving-side apparatus 76 so as to receive facsimile-image transmitted through a communication line 69.

The receiving-side apparatus 75 extracts an image of each plane from formatted image data received by the modem 77 so as to synthesize images of the planes into one image. Then, the receiving-side apparatus 75 transmits the synthesized image to the printer 73 or the printer 74. As an alternative to this, the client computers 71 and 72 are able to perform required processes so as to transmit processed image data from the printer 73 or 74.

Figure 24:
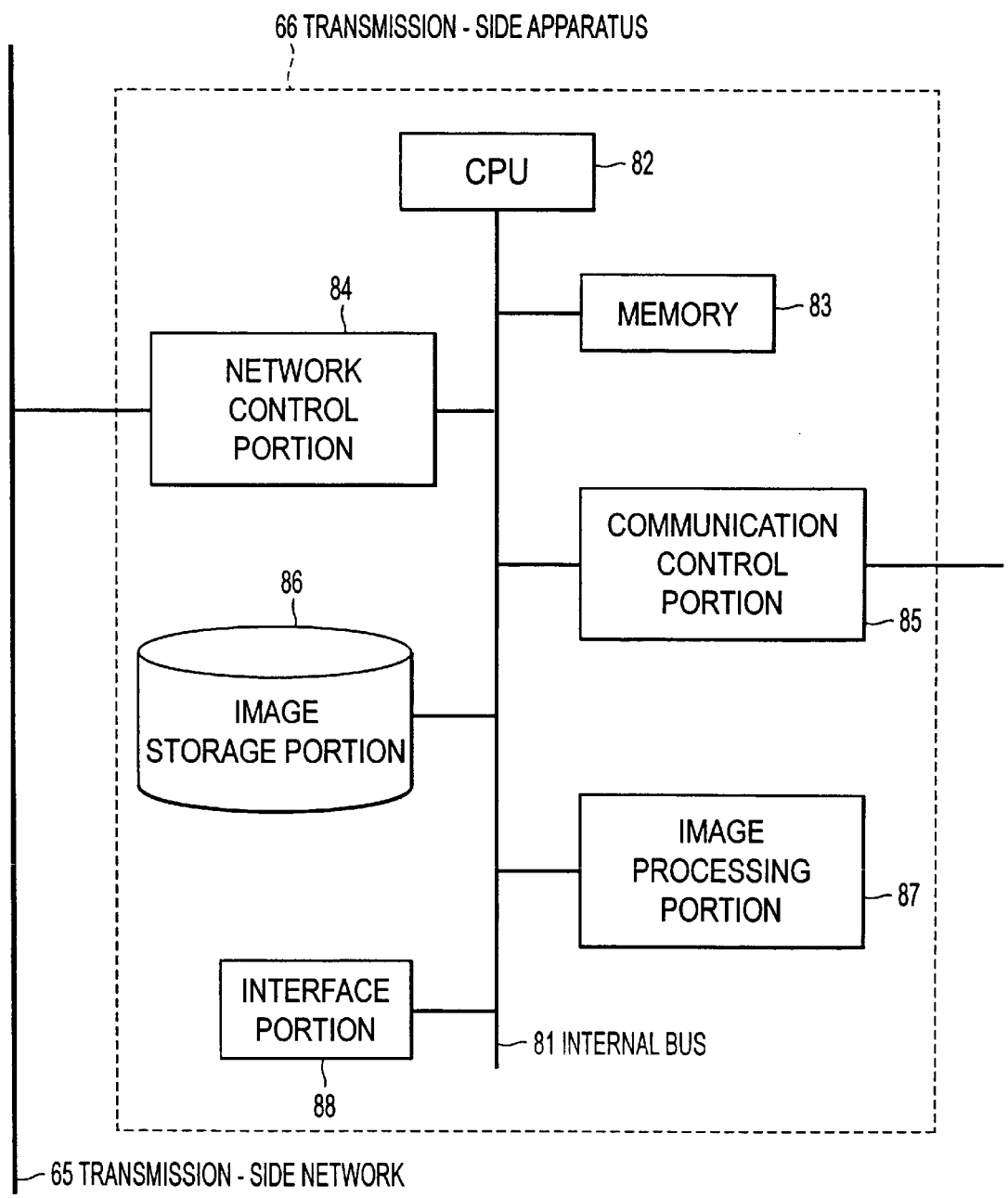
FIG. 24 is a block diagram showing an example of the internal structure of a transmission-side apparatus according to another example of the system incorporating the image processing apparatus according to the present invention.

FIG. 24 is a block diagram showing an example of an internal structure of the transmission-side apparatus. In the drawing, reference numeral 81 represents an internal bus, 82 represents a CPU, 83 represents a memory, 84 represents a network control portion, 85 represents a communication control portion, 86 represents an image storage portion, 87 represents an image processing portion and 88 represents an interface portion. In the transmission-side apparatus 66 shown in FIG. 24, the CPU 82, the memory 83, the network control portion 84, the communication control portion 85, the image storage portion 86, the image processing portion 87 and the interface portion 88 are connected through the internal bus 81.

The CPU 82 controls the transmission-side apparatus 66. The memory 83 temporarily stores image data. The network control portion 84 receives image data from the host computers 61 to 64 through the transmission-side network 65 or transmits image data to the other host computers 61 to 64 through the transmission-side network 65. The communication control portion 85 facsimile-transmits image data through the modem 67 connected to the outside. As shown in FIG. 23, a communication line, such as a public telephone line 70 or the like is connected to the modem 67 so as to perform communication. Thus, image data can be facsimile-transmitted through the foregoing communication line 70. The image storage portion 86 stores image data. The image processing portion 87 is the image processing apparatus according to any one of first to sixth embodiments of the present invention. The image processing portion 87 separates image data received through the network control portion 84 into planes in a multi-layered structure. Then, the image processing portion 87 subjects the planes to the resolution converting process, and then laps the planes into a predetermined image format. As an alternative to this, the image processing portion 87 subjects the received image data to the resolution converting process, and then separates image data into planes so as to lap the same into a predetermined image format. The interface portion 88 is an interface to which an image input unit, such as a scanner or digital camera, is connected. The image input units are connected to the transmission-side network 65 so as to input an image through the network control portion 84.

Figure 25:
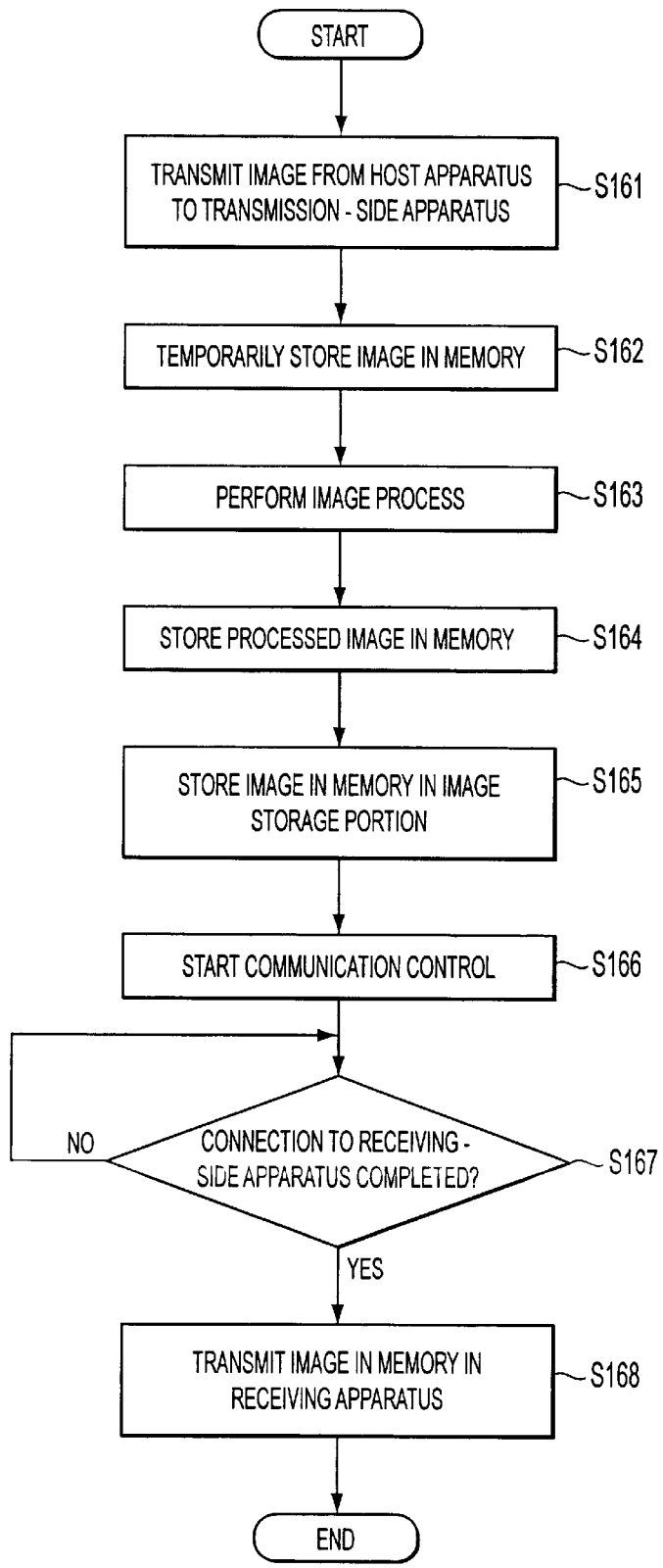
FIG. 25 is a flow chart showing an example of the operation of another example of the system incorporating the image processing apparatus according to the present invention.

FIG. 25 is a flow chart showing the operation of another example of the system incorporating the image processing apparatus according to the present invention. FIG. 25 shows the operation which is performed from a moment at which an image is produced by the host computers 61 to 64 to a moment at which the processed image is facsimile-transmitted. In S161 a request is made from any one of the host computers 61 to 64 connected to the transmission-side network 65 to transmit an image to the transmission-side apparatus 66. Thus, the image is transmitted.

When the transmission-side apparatus 66 has received the transmission request through the network control portion 84, a predetermined parameter is set to a register of a DMAC (Direct Memory Access Controller) (not shown). The parameter includes data storage addresses in the memory 83 or transfer rates. When parameter has been set, the CPU 82 issues a command indicating a ready state to the network control portion 84. Then, in S162 image data sequentially transmitted from any one of the host computers 61 to 64 is stored in the memory 83.

When all of image data items have been stored in the memory 83, the CPU 2 sets, to the register of the DMAC, parameters including image reading addresses and writing addresses of processed image data. Then, the CPU 2 sequentially reads image data on the memory 83 so as to transmit image data to the image processing portion 87. In S163 the image processing portion 87 executes the process according to the first to sixth embodiments so as to transmit formatted image data. If the image processing portion 87 has the structure according to the first to fourth embodiments, supplied image data is sequentially subjected to the attribute determination, separation to planes, resolution conversion of each plane and image format lapping so that formatted image data is transmitted.

In S164 image data subjected to the image process and thus formatted is sequentially stored in the memory 83 such as the writing address previously set to the register of the DMAC is made to be a starting point. The memory 83 may have a capacity capable of storing both of image data before the image process and that after subjected to the process. The memory 83 may have a capacity corresponding to the larger quantity so as to dynamically control writing and reading. In S165 image data stored in the memory 83 is sequentially stored in the image storage portion 86 so that image data is stored.

After storage of image data subjected to the image process has been completed, the CPU 82 starts communication to a receiving-side system which has been instructed, S166. Detailed description of a communication protocol is omitted here. In S167 completion of the connection with the receiving-side system has been confirmed, image data subjected to the image process and stored in the memory 83 is, in S168, sequentially read so as to be transmitted to the receiving-side system.

As a result of the foregoing process, image data transmitted from the host computers 61 to 64 can be subjected to a predetermined image process and facsimile-transmitted to the receiving-side system. As an alternative to this, image data subjected to the image process and stored in the memory 83 may sequentially be read through the network control portion 84 so as to be transmitted to the host computers 61 to 64.

In the receiving-side system, the receiving-side apparatus 76 reconstruct the image in accordance with data of the facsimile-image received by the modem 77. A separating information plane, a character information plane and a picture information plane are fetched from formatted image data so as to make match at least the resolution of the character information plane and that of the picture information plane. Then, either of character information or picture information is selected in accordance with separating information of the separating information plane so as to be transmitted. As a result, the image can be reconstructed. Under control of the client computers 71 and 72, a required image process is performed. Then, the image can be transmitted from the printer 73 or the printer 74.

In the foregoing embodiments, the image processing apparatus according to the present invention is applied to the transmission-side apparatus. The structure of the seventh embodiment of the image processing apparatus according to the present invention may be applied to the receiving-side apparatus. In this case, image data in an arbitrary format is converted into image data having the above-mentioned plural plane structure so as to be stored in, for example, an image data base. If necessary, image data is transmitted to the printers 73 and 74 or transmitted to another system through a communication line.

The structure of the system is not limited to the foregoing embodiments. A variety of system may be constituted.

As can be understood from the foregoing description, according to the present invention, supplied image information is separated into first piece of image data, second piece of image data and selecting data for selecting first piece of image data or second piece of image data. Then, image data is transmitted. A conversion process to an optimum resolution using an optimum resolution converting method for each data can be performed. Since resolution conversion adaptable to the characteristic of each image can be performed, deterioration in the quantity of the image can be prevented. If data does not require a high resolution, the resolution can be lowered to reduce the quantity of data. Therefore, the communication speed can be raised. As described above, effects can be obtained in that deterioration in the quality of the image is prevented and high speed communication is performed.

What is claimed is:

1. An image processing apparatus comprising:

separating means for separating supplied image information onto a first piece of image data, a second piece of image data, and selecting data for selecting one of the first piece of image data and the second piece of image data;

resolution converting means for converting a resolution of at least any one of the first piece of image data, the second piece of image data, and the selecting data separated by said separating means; and data transmitting means for transmitting data containing data having the resolution converted by said resolution converting means, wherein said resolution converting means has a plurality of selectable resolution converting methods to select a specific resolution converting method from the plural resolution converting methods for at least any one of the first piece of image data, the second piece of image data, and the selecting data which are converted so as to selectably convert the resolution according to a transmission attribute by a user.

2. The image processing apparatus of claim 1, further comprising:

transmission-attribute-information recognizing means for recognizing information of the transmission attribute instructed by a user, wherein said resolution converting means selects the specific resolution converting method in accordance with a result of recognition performed by said transmission-attribute-information recognizing means.

3. The image processing apparatus of claim 1, wherein said resolution converting means converts the resolutions by using resolution converting methods different for the first piece of image data, the second piece of image data, and the selecting data.

4. An image processing apparatus comprising:

resolution converting means for subjecting supplied image information to a selectable resolution converting process according to a transmission attribute by a user;

separating means for separating image information having the selectable resolution converted by said selectable resolution converting means into a first piece of image data, a second piece of image data, and a selecting data for selecting one of the first piece of image data and the second piece of image data; and data transmitting means for transmitting the first piece of image data, the second piece of image data, and the selecting data separated by said separating means.

5. The image processing apparatus of claim 4, further comprising:

transmission-attribute-information recognizing means for recognizing information of the transmission attribute instructed by a user, wherein said resolution converting means selects the specific resolution converting method in accordance with a result of recognition performed by said transmission-attribute-information recognizing means.

6. The image processing apparatus of claim 4, further comprising:

a receiver which receives each data which is transmitted from said data transmitting means wherein said resolution converting means determines the resolution in accordance with a resolution of the receiver.

7. An image processing method comprising:

a separating step for separating supplied image information having a supplied image resolution into a first piece of image data, as a second piece of image data, and a selecting data for selecting either of the first piece of image data or the second piece of image data, separation being performed in a state of the supplied image resolution;

a resolution converting step for converting a selectable resolution of at least either of the first piece of image data or the second piece of image data separated in said separating step in accordance with a transmission attribute by a user, and a data transmission step for transmitting each data containing data having the resolution converted in said resolution step.

8. The image processing method of claim 7, wherein said resolution converting step is a step for converting the resolutions of the first piece of image data and the second piece of image data into resolutions different from the supplied image resolution.

9. The image processing method of claim 7, wherein said resolution converting step is a step for converting the resolutions of the first piece of image data and the second piece of image data into a resolution which is 1/n (n is an integer) of the supplied image resolution.

10. The image processing method of claim 7, wherein said resolution converging step is a step for converting the resolutions of the first piece of image data and the second piece of image data by using the same resolution converting method.

11. The image processing method of claim 7, wherein said resolution converting step is a step for converting the resolutions of the first piece of image data and the second piece of image data by using different resolution converting methods.

* * * * *